Sept. 24, 1940.  G. HAZELTON  2,215,524
HEEL-SEAT FITTING MACHINE
Filed Jan. 19, 1940   11 Sheets-Sheet 6
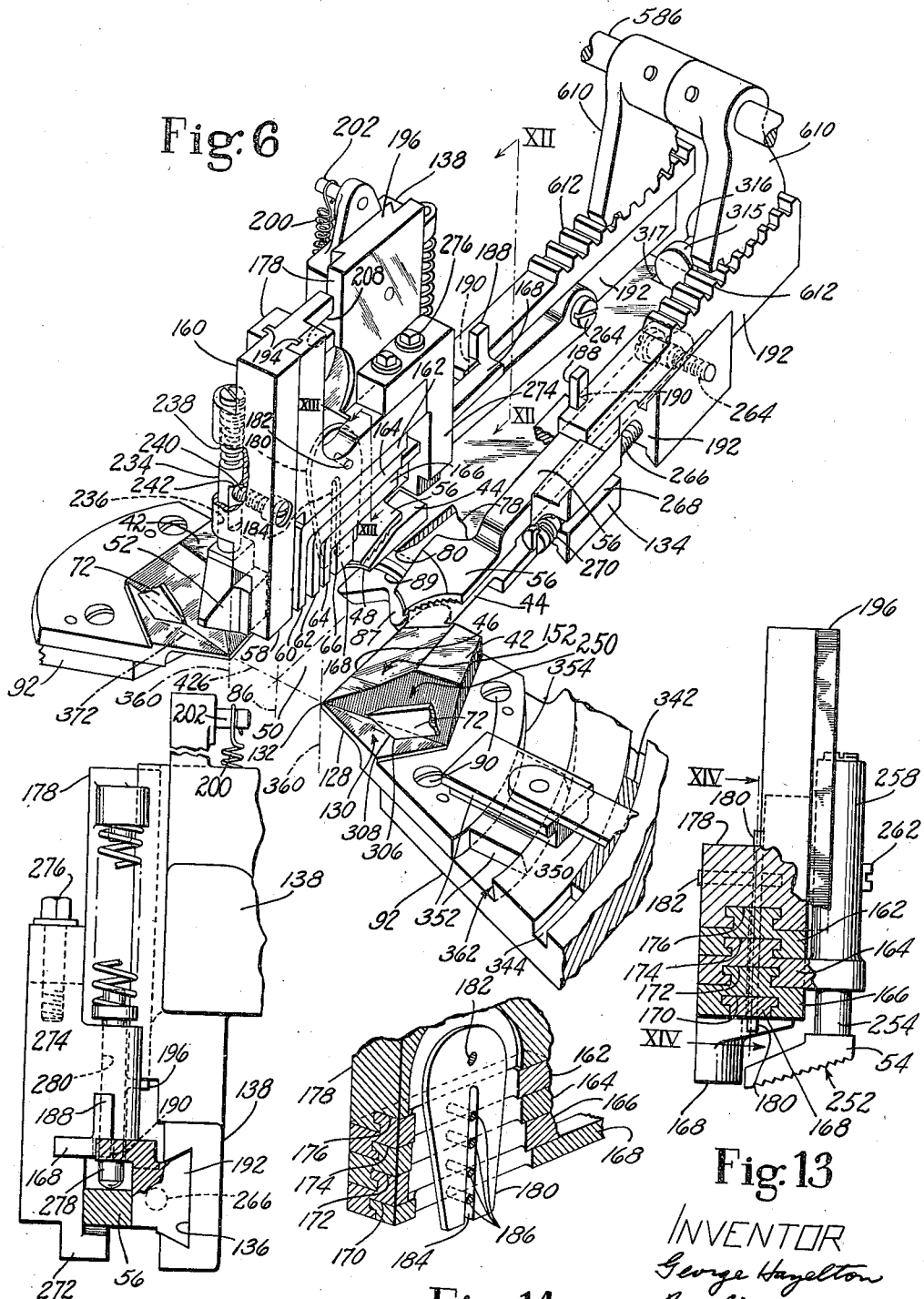

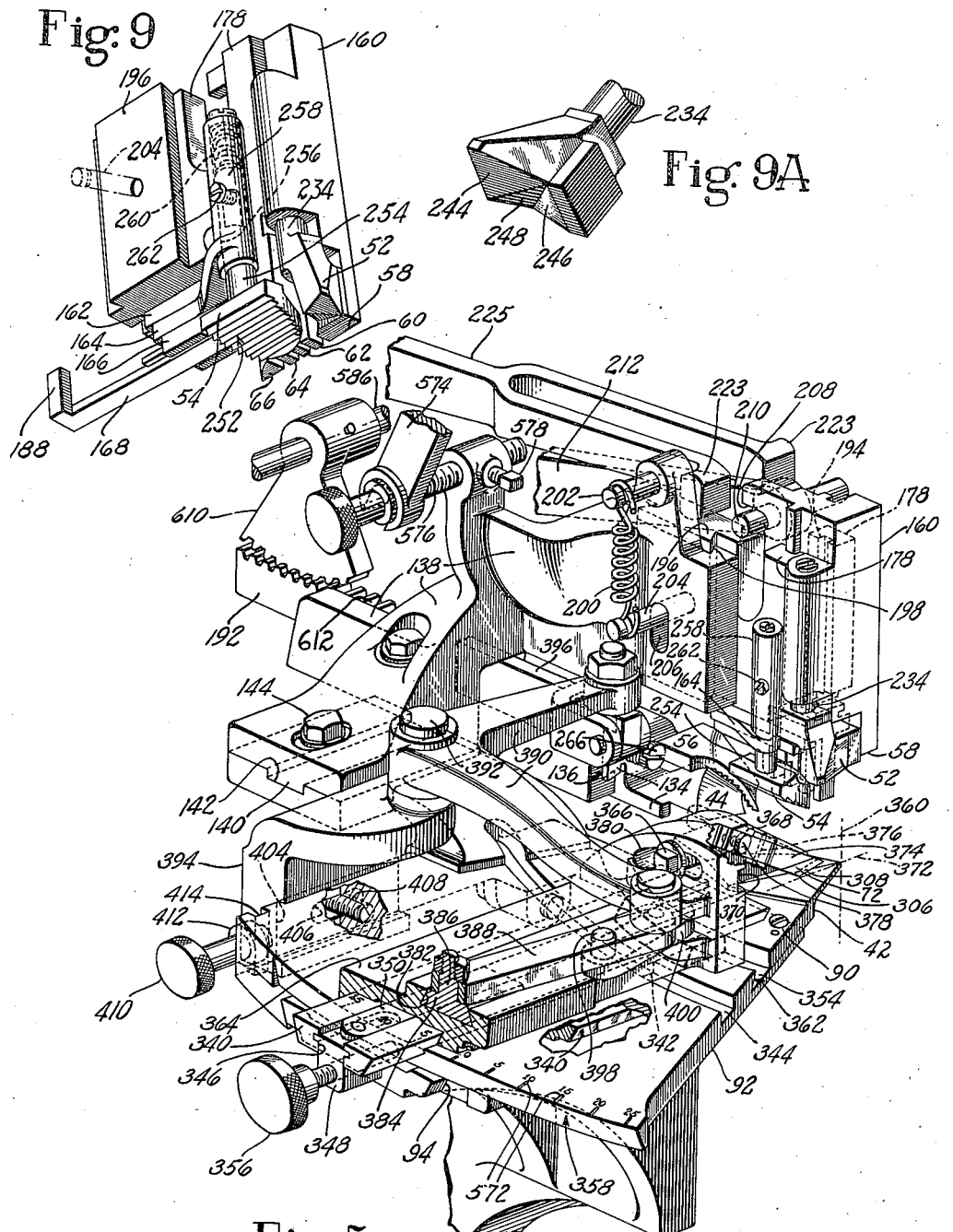

Sept. 24, 1940.                 G. HAZELTON                    2,215,524
                          HEEL-SEAT FITTING MACHINE
                          Filed Jan. 19, 1940          11 Sheets-Sheet 7
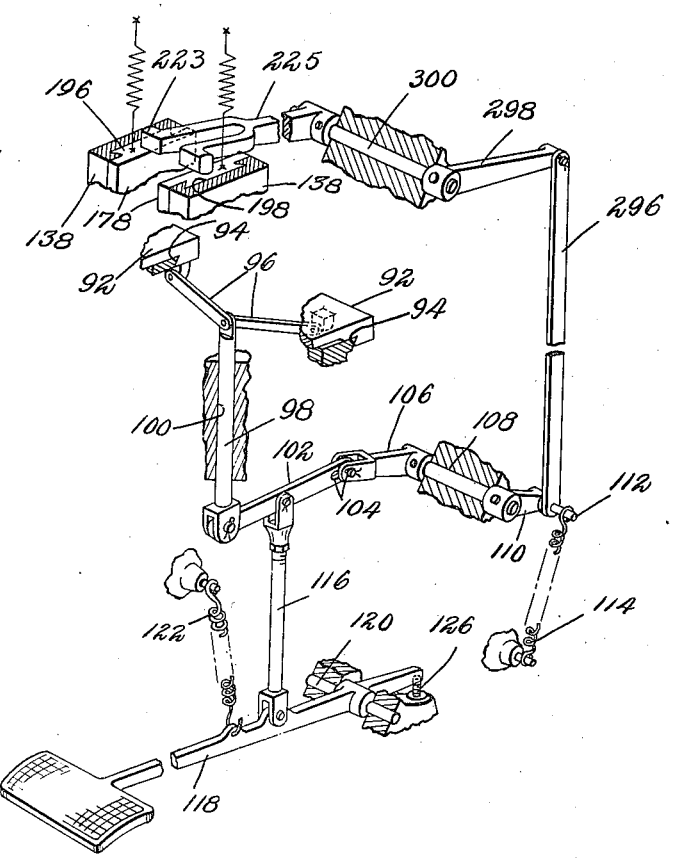
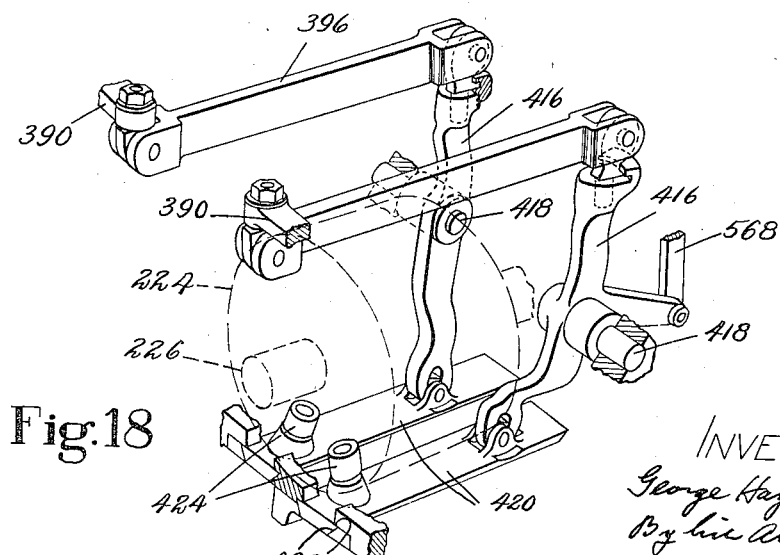
INVENTOR
George Hazelton
By his Attorney
Victor Cobb Sept. 24, 1940.　　　　G. HAZELTON　　　　2,215,524
HEEL-SEAT FITTING MACHINE
Filed Jan. 19, 1940　　　11 Sheets-Sheet 8

INVENTOR:
George Hazelton
By his Attorney
Victor Colub

Sept. 24, 1940.    G. HAZELTON    2,215,524
HEEL-SEAT FITTING MACHINE
Filed Jan. 19, 1940    11 Sheets-Sheet 10
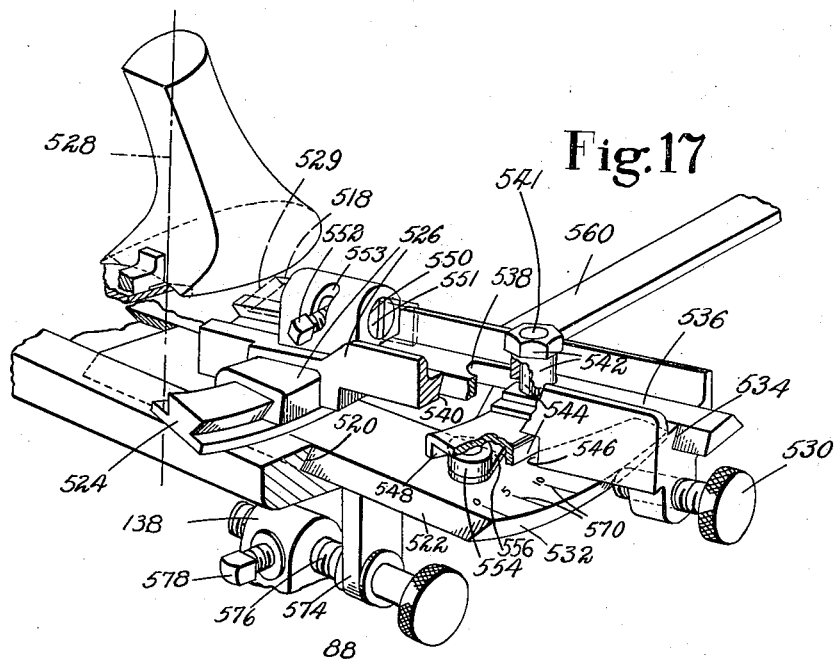
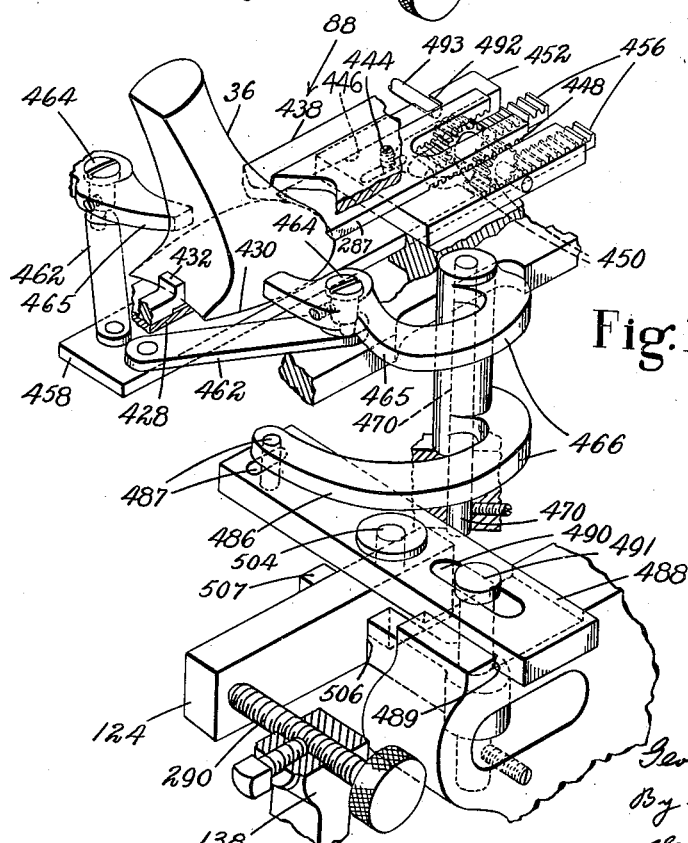

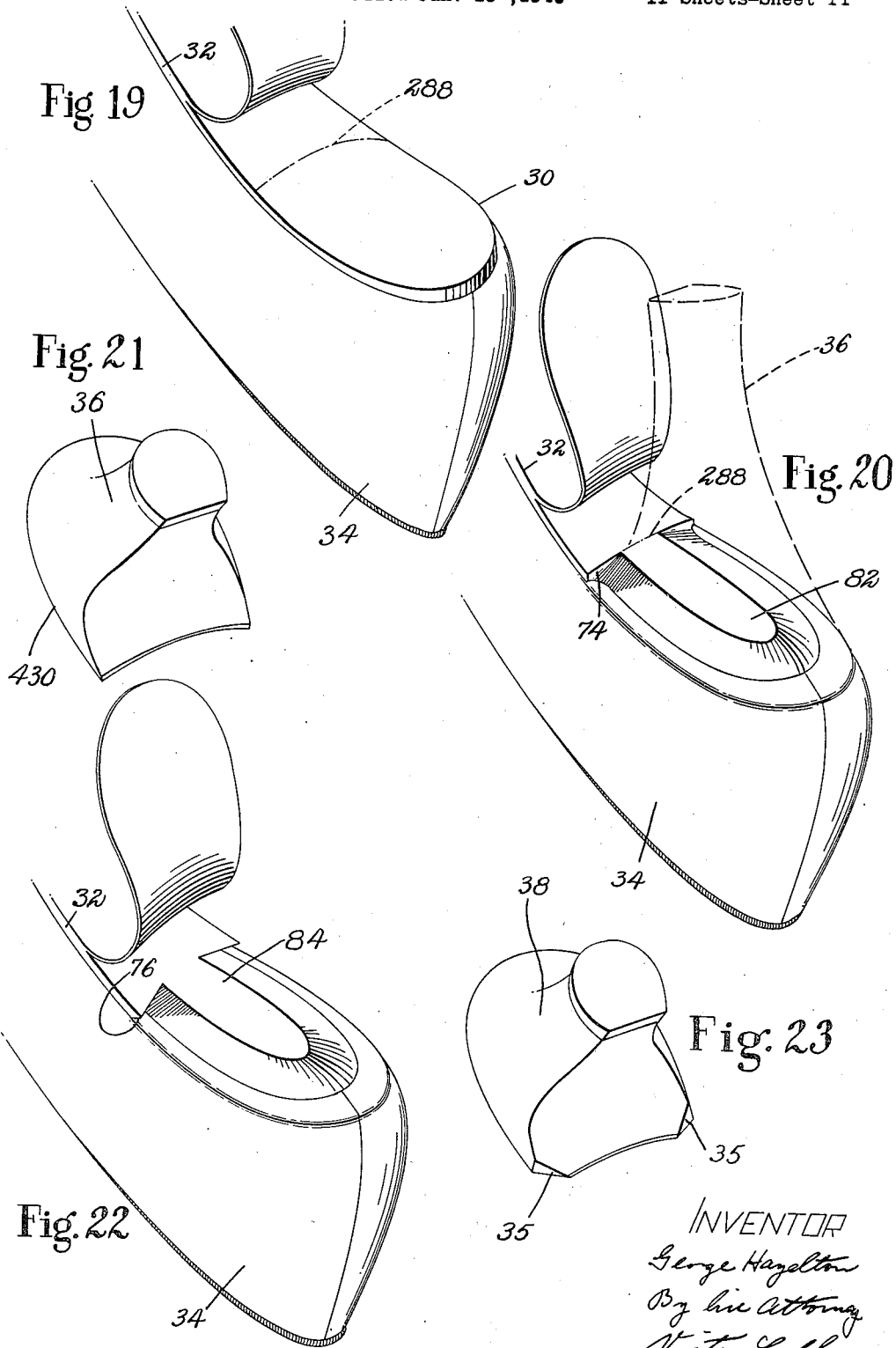

Patented Sept. 24, 1940

2,215,524

UNITED STATES PATENT OFFICE 2,215,524

HEEL-SEAT FITTING MACHINE

George Hazelton, Leicester, England, assignor to United Shoe Machinery Corporation, Borough of Flemington, N. J., a corporation of New Jersey Application January 19, 1940, Serial No. 314,715
In Great Britain December 31, 1938

44 Claims. (Cl. 12—31.5)

This invention relates to heel-seat fitting machines and is illustrated as embodied in a machine adapted to reduce the heel-seat portion of an attached sole of a shoe and to form upon said sole, and at the upper breast margins of a Louis heel to be attached to the shoe, pairs of shoulders respectively, which are approximately complemental to each other and are in registration with each other in the finished shoe.

In fitting the heel-seat portions of attached soles of shoes for the reception of heels by the use of proposed heel-seat fitting machines, it is customary to position the heel-seat portion of a sole upon the upper face of a crease plate or a platen having a U-shaped opening, and after clamping the margin of the heel-seat portion of the sole against the crease plate to force the central part of said heel-seat portion through said opening and below a flat lower face of the plate. A knife is then moved forwardly with its cutting edge in engagement with said flat lower face of the crease plate to remove from the sole the horseshoe-shaped piece of sole material in engagement with the upper face of the crease plate, said knife, in conjunction with one or more knives which form heel breast receiving shoulders on the sole, forming a heel seat tab at the rear end of the sole.

In order to afford adequate support for the heel, it is desirable that the outline of the heel-seat tab shall be slightly smaller than the outline of the attaching face of the heel to be attached to the shoe, and that the heel engaging face of the tab shall be approximately complemental to the attaching face of the heel, it being desirable, of course, to insure that the tab shall not be so large that it prevents the rim of the attaching face of the heel from being forced into snug engagement with the counter portion of the shoe during the heel attaching operation.

The outline of a heel-seat tab formed upon an attached sole of a shoe by a machine of the general type above referred to, corresponds to the outline of the U-shaped opening of the particular crease plate in the machine and, accordingly, it is customary in the use of such a machine to substitute for the crease plate, one of a plurality of interchangeable crease plates having U-shaped openings of different sizes and shapes in accordance with the desired shape of the tab, and also to substitute for a clamp which forces the margin of the heel-seat portion of the sole against the crease plate, and for a presser member which forces the central part of said heel-seat portion through the opening, other interchangeable clamps and presser members of different sizes or shapes. Such a practice requires a large number of interchangeable parts which the operators are not likely to use because of the time consumed. Moreover, it is impracticable to have a complete set of parts for every size of shoe and, therefore, one set of interchangeable parts has to accommodate several sizes of a run of shoes.

It is an object of the present invention to provide an improved machine of the general type above described adapted to form upon the attached soles of shoes, heel-seat tabs of different sizes and shapes in accordance with the particular sizes and shapes of heels which are to be attached to the shoes.

With the above object in view, the illustrative machine is provided with a sole supporting platen comprising right and left pairs of front and rear crease plates shaped and arranged to form a U-shaped opening, the two rear crease plates being movable into different adjusted positions lengthwise of the opening with relation to the two front crease plates, in accordance with the lengthwise measurement of a heel in a heel gage, in order to vary the length of said opening, the associated right and left pairs of crease plates being movable toward and away from each other into different adjusted positions in accordance with the width of a heel in the heel gage, in order to vary the width of said opening. In order that the central parts of heel-seat portions of soles of shoes shall be effectively forced through U-shaped openings of different sizes and shapes formed by the crease plates, the illustrative machine, in accordance with a feature of the present invention, is provided with a bulger comprising a plurality of presser members, means for relatively adjusting the presser members to vary the effective shape of the bulger in accordance with adjustments of the crease plates, and therefore the shape of the U-shaped opening, and means for moving the bulger to force the central part of the heel-seat portion of the sole through said opening.

The bulger of the illustrative machine comprises right and left rows of presser members extending along the lateral margins respectively, of the U-shaped opening formed by the crease plates, the margin of the heel-seat portion of the sole being clamped against the portions of the front and rear crease plates bordering the U-shaped opening, prior to and during the operation of the bulger, by a plurality of right and left clamp members.

In order to insure that the clamp members and the presser members shall effectively co-operate with the crease plates in deforming the heel-seat portions of soles as above described to provide heel-seat tabs corresponding in size and shape to the U-shaped openings respectively, of the crease plates, irrespective of the setting of said plates, the right and left clamp members and rows of presser members are movable into different widthwise adjusted positions together with their associated right and left pairs of front and rear crease plates, the effective lengths of the right and left clamp members and rows of presser members being varied in accordance with variations in the lengthwise adjustment of the rear crease plates and, therefore, the length of the U-shaped opening.

As disclosed in United States Letters Patent No. 1,847,244 granted March 1, 1932, on an application filed in the name of Hazelton et al., it is sometimes the practice in fitting the heel-seat portion of the sole of a shoe for the reception of a Louis heel, to form upon the sole undercut heel breast receiving shoulders which extend inwardly and forwardly of the sole from the lateral margins of the same, and also to form at the lateral margins of the forwardly projecting lip of the Louis heel a pair of shoulders which are approximately complemental to and in the finished shoe register with the heel breast receiving shoulders formed on the sole.

In the illustrative machine the angles at which the heel breast receiving shoulders are disposed to the central heightwise plane of the shoe may be varied, said shoulders for a given angle of cut being of the same width irrespective of the size of the shoe. In order to form at the upper lateral margins of the breasts of Louis heels of different sizes shoulders which for a given angle of cut are of the same width, the illustrative machine, in accordance with another feature of the present invention, comprises mechanism for measuring a heel widthwise, knives for forming at the upper breast margins of the heel a pair of shoulders which extend inwardly from the sides of the heel and terminate at the forward edge of the forwardly projecting lip of said heel, and mechanism for initially moving the knives into different starting positions in accordance with the width of the heel.

Guides and operating mechanism for the respective heel trimming knives are mounted on carrier slides which are secured to corresponding carrier beds upon which guides and operating mechanism respectively, for the knives which form the heel breast receiving shoulders on the sole, are mounted. The carrier slides and the carrier beds are initially moved together widthwise of the heel and the shoe respectively to predetermined adjusted positions in accordance with the position of a stop operatively connected to an abutment which measures the heel in the heel gage widthwise, the arrangement being such that the relative starting positions of the heel trimming knives and the heel on the one hand and said knives which form the heel breast receiving shoulders and the sole of the shoe on the other hand are always the same.

The angles at which the heel trimming knives approach the central heightwise plane of the heel during their cutting strokes may be varied in accordance with the angles of the heel breast receiving shoulders being formed upon the sole, the length of the cutting strokes of both pairs of knives respectively, being constant irrespective of their angular settings or their widthwise adjusted positions.

With the above and other objects and features in view, the invention will now be described with reference to the accompanying drawings, which disclose a preferred embodiment thereof, and pointed out in the claims.

Fig. 5 is a perspective view of a left sector of the machine and mechanism carried thereby;

Fig. 6 is a perspective view showing crease plates, clamp members and presser members of the machine together with a portion of the mechanism through which the same are moved into different adjusted positions lengthwise of the machine in accordance with the length of a heel in the heel measuring gage;

Fig. 7 is a skeleton view of mechanism for operating the sectors and for operating carrier slides through which the clamp members and the presser members are actuated;

Fig. 9 is a perspective view of the left carrier slide and its associated vertical slide and clamp and presser members;

Fig. 9A is a view showing the sole engaging portion of the front clamp shown in Fig. 9;

Fig. 12 shows a bracket which is secured to the left carrier slide, as viewed in the direction indicated by line XII—XII on Fig. 6;

Fig. 13 is a detail view, partly in section on the line XIII—XIII of Fig. 6, of the left carrier slide and nested slides supported thereby, as viewed from the rear;

Fig. 14 is a perspective view, partly in section on line XIV—XIV of Fig. 13, of portions of the carrier slide and the nested slides;

Fig. 16 shows in perspective mechanism for measuring the heel in the heel gage widthwise and connections for setting in different adjusted positions a stop through which inward movement of the sectors is limited;

Fig. 17 is a perspective view of mechanism for trimming the upper breast margins of the forwardly projecting lips of Louis heels to form shoulders thereon;

Fig. 18 is a skeleton view of portions of mechanism for operating the heel trimming knives and for operating other knives which form heel breast receiving shoulders upon the sole of the shoe;

Fig. 19 shows in perspective the rear end of a shoe which is to be operated upon by the illustrative machine;

Fig. 20 is a view of the shoe shown in Fig. 19 after the heel-seat portion of its sole has been fitted for the reception of a Louis heel by the above machine;

Fig. 21 is a perspective view of a Louis heel which is to be attached to the shoe of Fig. 20;

Fig. 22 shows the shoe of Fig. 19 after the heel-seat portion of its attached sole has been reduced and heel breast receiving shoulders of a modified type have been formed thereon; and Fig. 23 is a perspective view of the Louis heel shown in Fig. 21 after the upper breast margins of the forwardly projecting lip of the heel have been trimmed by the above machine to form shoulders which are approximately complemental to the heel breast receiving shoulders of the sole of Fig. 22.

Figure 10:
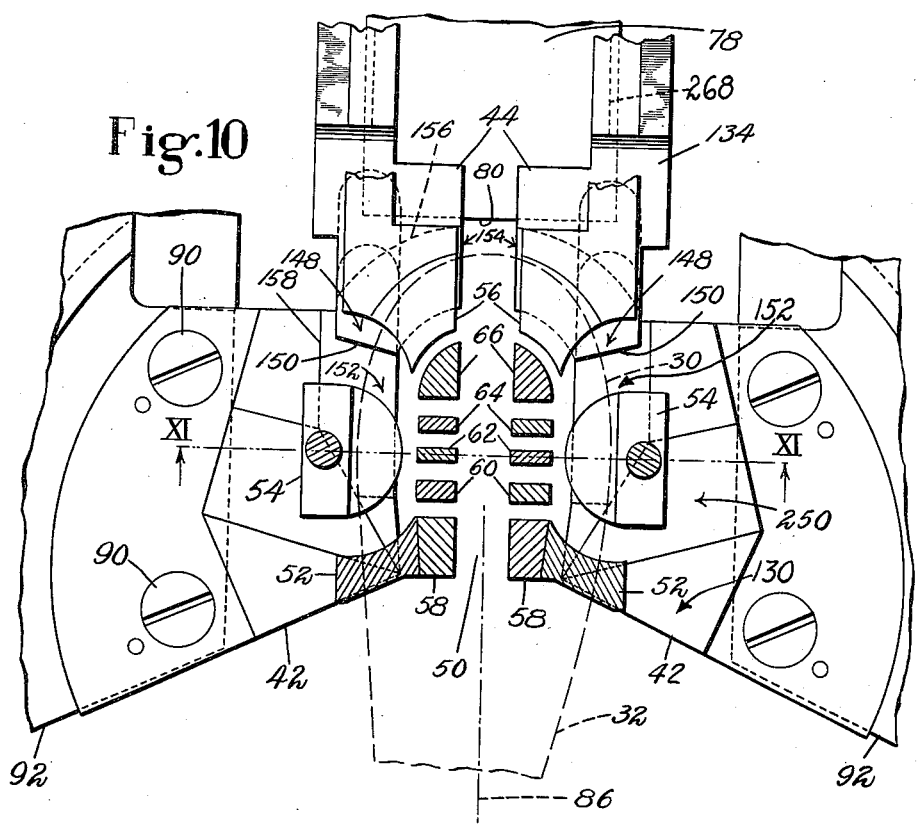
Fig. 10 is a view on line X—X of Fig. 11 showing the relative positions of the crease plates, the clamp members and the presser members when the central part of the heel-seat portion of the sole has been forced by the presser members through a U-shaped opening formed by the crease plates.

The illustrative machine is described with reference to reducing the heel-seat portion 30 (Figs. 10, 11 and 19) of an attached sole 32 (Figs. 19, 20 and 22) of a shoe 34 to the form illustrated in Fig. 20 for the reception of a regular Louis heel 36 (Figs. 2, 20 and 21), and also with reference to reducing the heel-seat portion of the sole of the shoe to the form illustrated in Fig. 22 and to forming shoulders 35 (Fig. 23) at the upper breast margins of the forwardly projecting lip of the heel 36 to provide a modified heel 38 (Fig. 23) to be attached to the fitted heel-seat portion of the shoe shown in Fig. 22.

Figure 8:
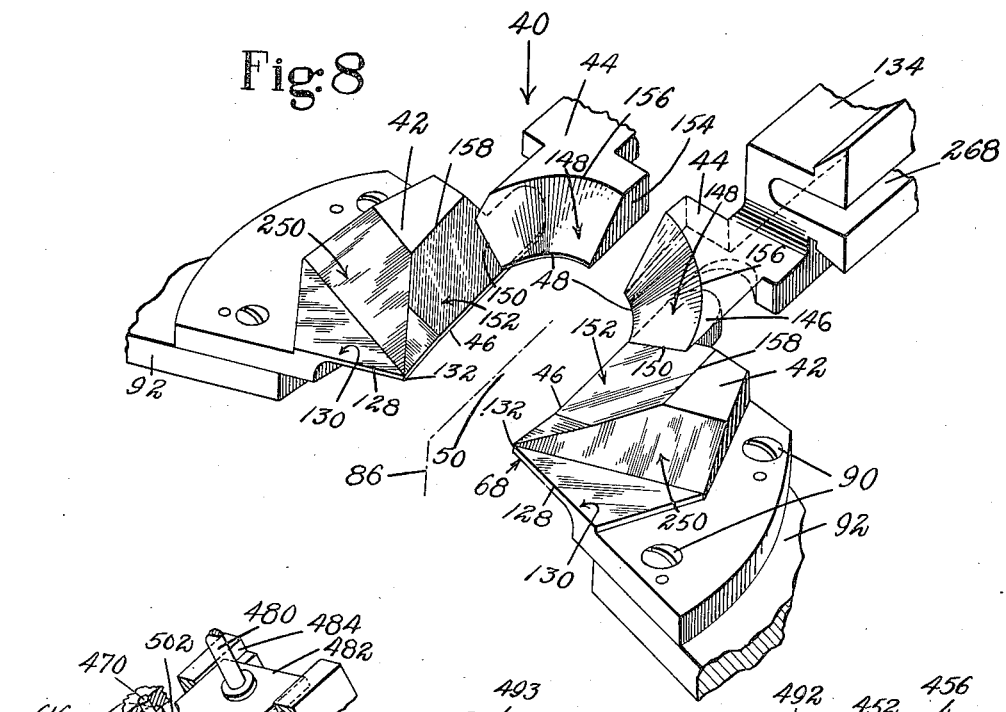
Fig. 8 is a perspective view of a sole supporting platen comprising pairs of front and rear crease plates.
Figure 11:
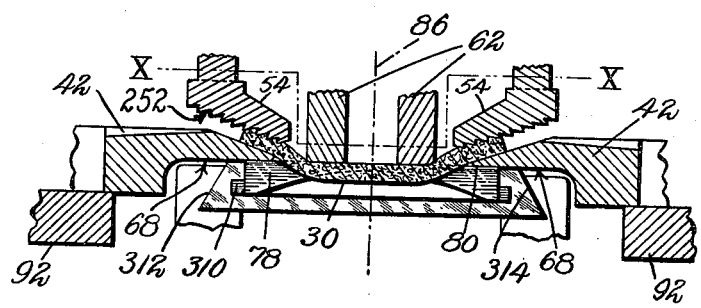
Fig. 11 is a section on line XI—XI of Fig. 10.

The illustrative machine has a platen 40 (Fig. 8) comprising front and rear crease plates 42, 44 (Figs. 2, 5, 6, 8 and 10) respectively, the thin inner edges 46, 48 (Figs. 6 and 8) of which form a U-shaped opening 50, a clamp comprising right and left clamp members 52, 54, and 56 (Figs. 2, 5 and 10) for forcing the margin of the heel-seat portion 30 of the attached sole 32 of the shoe 34 positioned upon the platen 40 against portions of the platen bordering the U-shaped opening 50, a pair of knives 72 (Figs. 1, 2, 5 and 6) which are movable inwardly from opposite sides of the attached sole of the shoe to form heel breast receiving shoulders 74 (Fig. 20) or 76 (Fig. 22), a bulger comprising right and left presser or bulger members 58, 60, 62, 64 and 66 (Figs. 2, 6, 9 and 10) for forcing the central part of the clamped heel-seat portion 30 of the sole through the U-shaped opening 50 and below approximately flat lower faces 68, 70 (Fig. 2) of the respective crease plates 42, 44, as shown in Fig. 11, and a back knife 78 (Figs. 2, 6, 10 and 11) movable forwardly with its straight cutting edge 80 in approximate engagement with the flat lower faces 68, 70 of the crease plates 42, 44 respectively, to reduce the heel-seat portion 30 of the sole 32, and co-operating with the knives 72 to form a heel-seat tab 82 (Fig. 20) or a heel-seat tab 84 (Fig. 22) the heel engaging face of which is slightly smaller than but approximately complemental to the attaching face of the heel to be attached to the shoe.

In order to form upon the attached soles of shoes heel-seat tabs 82 or 84 of different sizes and shapes in accordance with different sizes and styles of heels to be attached to the shoes, it is desirable that the shape of the opening 50 (Figs. 6 and 8) shall be varied. Accordingly, associated pairs of front and rear crease plates 42, 44 respectively, may be moved into different operative positions toward and away from a central heightwise plane 86 (Figs. 1, 4 and 6) of the machine to vary the width of the U-shaped opening 50 in accordance with the measured width of the heel 36 which is to be attached to the shoe and is positioned in a heel gage 88 (Figs. 2, 4 and 16), and the two rear crease plates 44 may be moved into different adjusted positions lengthwise of the U-shaped opening 50 with relation to the front crease plates 42 to vary the length of said opening in accordance with the length of the heel 36 in the heel gage 88.

The shoe 34 is positioned widthwise and lengthwise in the machine with the heel-seat portion 30 of its attached sole 32 overlying the platen 40, by a centralizing gage 87 (Figs. 1, 2 and 6) and a back or counter gage 89, the counter gage being movable forwardly and rearwardly along a guideway 91 (Figs. 1, 2 and 15) of the machine frame into different operative positions together with the rear crease plates 44, through mechanism which will appear later, in accordance with the length of the heel 36 in the heel gage 88.

In order that the right and left clamp members 52, 54 and 56 (Figs. 2, 5 and 10) shall effectively force the margins of the heel-seat portions 30 of attached soles 32 of shoes against the platen 40 (Fig. 8), and that the presser members 58, 60, 62, 64 and 66 (Figs. 2, 6, 9 and 10) shall effectively force the central part of the heel-seat portion of the sole through the U-shaped opening 50 (Figs. 6 and 8) irrespective of the adjusted positions of the front and rear crease plates 42 and 44 respectively, and therefore the shape of said opening, the clamp members and the presser members, as will appear later, are also adjustable lengthwise and widthwise of the U-shaped opening in accordance with the width and length respectively, of said opening.

Each of the front crease plates 42 is secured by screws 90 (Figs. 5, 6, 8 and 10) to a sector or carrier bed 92 upon which one of the shoulder forming knives 72, together with operating and guiding mechanism therefor, is mounted. The sectors 92 are movable toward and away from each other along dovetail guides 94 (Figs. 1, 2, 3, 5 and 7) of the machine frame and are pivoted to links 96 (Figs. 1, 2 and 7) respectively, which are pivoted at their inner ends to a rod 98 mounted for vertical movement in a guideway 100 of the machine frame. The lower end portion of the rod 98 is pivoted to the forward end of a lever 102 (Figs. 2 and 7), the rear portion of which is pivoted through a pin and elongated slot connection 104 to the forward end of a lever 106 pinned to the left end of a shaft 108 journaled in the machine frame. Pinned to the right end of the shaft 108 is a rearwardly extending lever 110 carrying a projecting fulcrum pin 112 embraced by the upper end of a spring 114 the lower end of which is secured to the machine frame.

Figure 1:
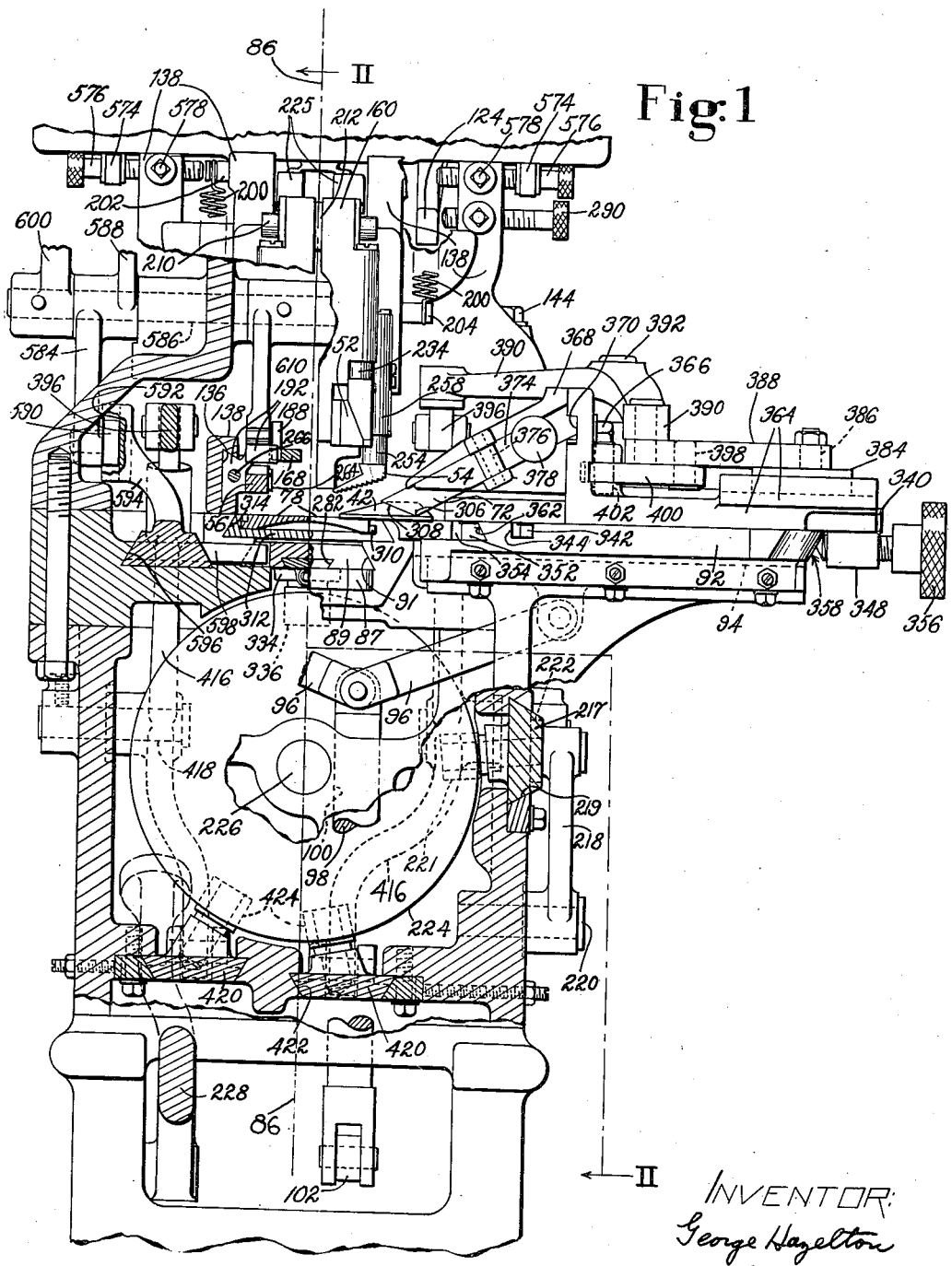
Fig. 1 is a front view, partly broken away and partly in section on line I—I of Fig. 2, of the illustrative machine.
Figure 2:
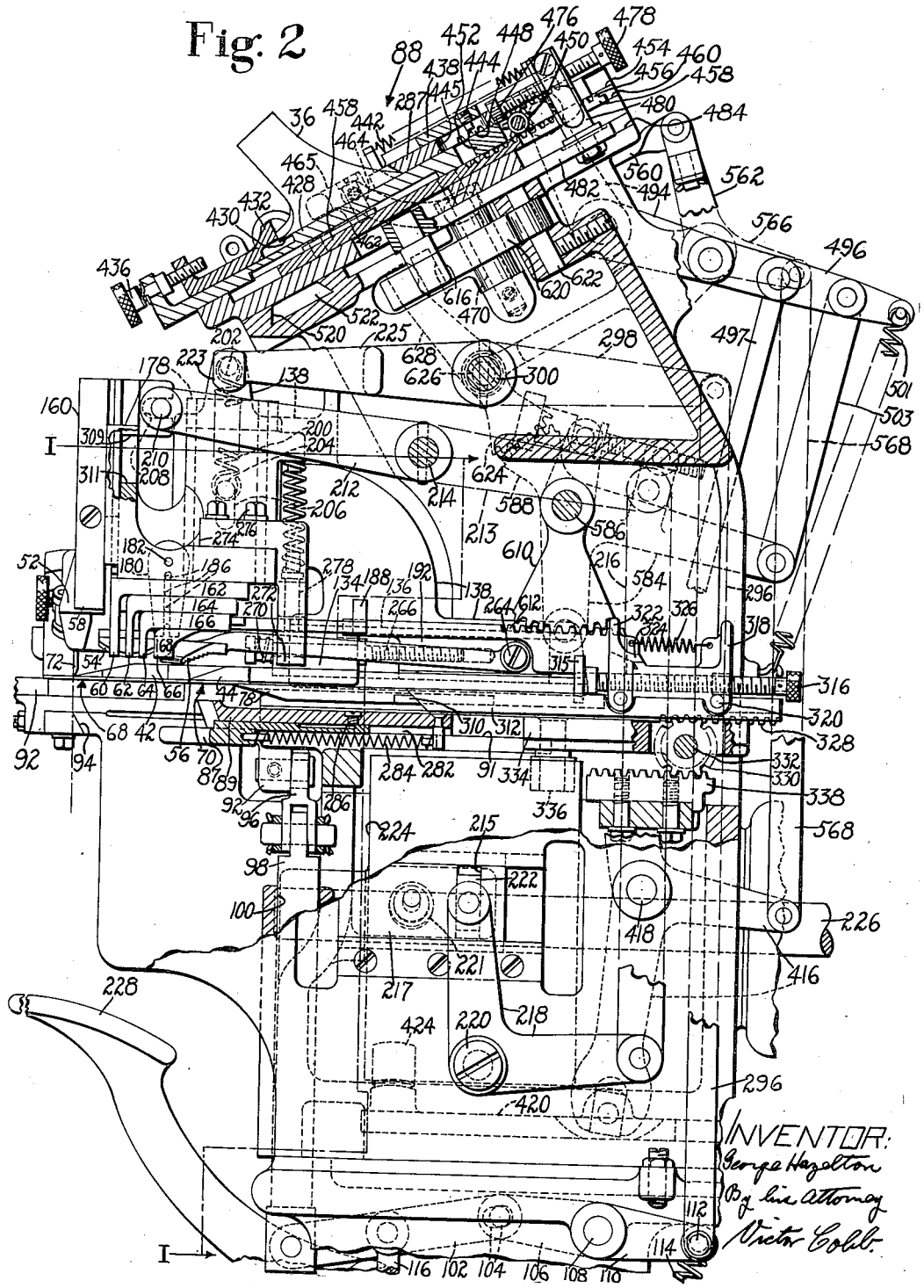
Fig. 2 is a vertical section on line II—II of Fig. 1.
Figure 3:
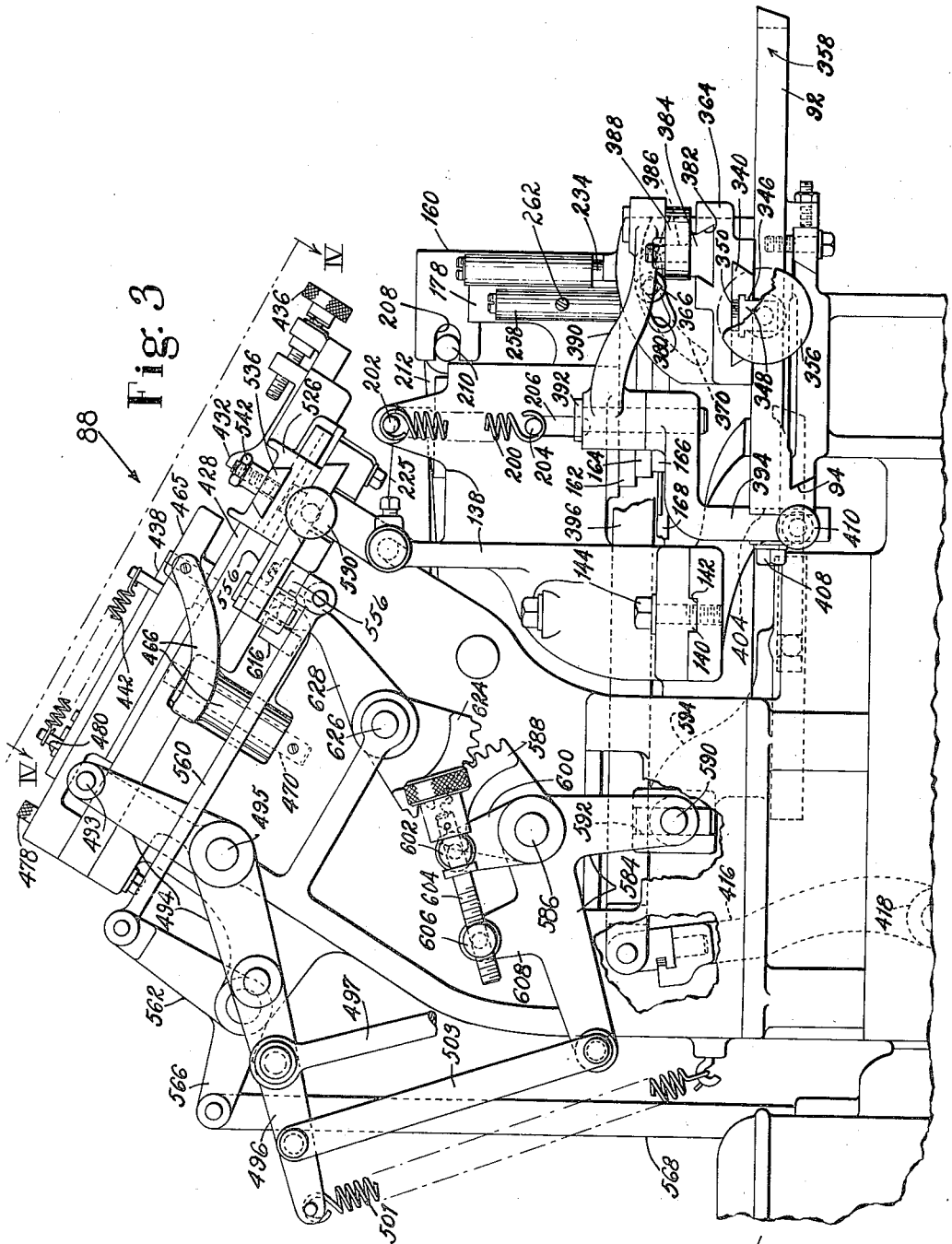
Fig. 3 shows the left side of the machine the lower portion of which has been broken away.
Figure 4:
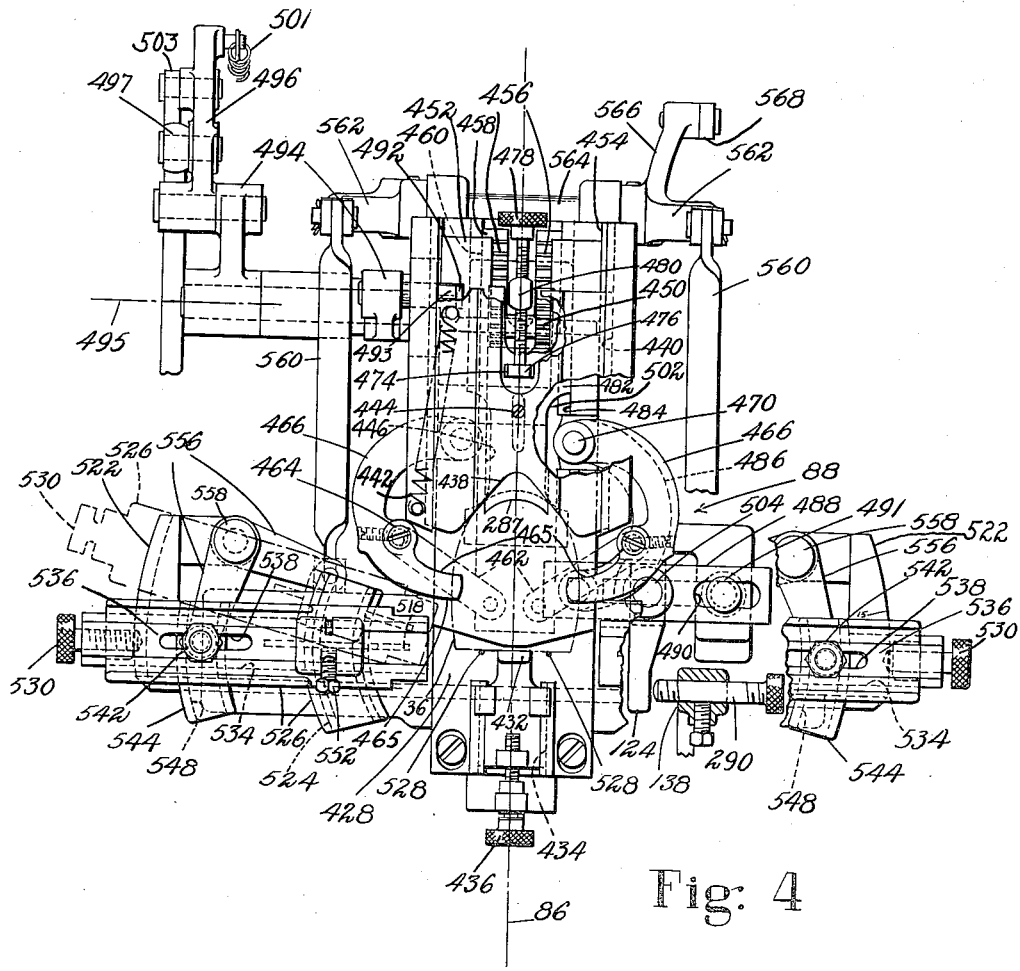
Fig. 4 shows a heel measuring gage of the machine as viewed in the direction indicated by line IV—IV of Fig. 3.

Pivoted to the central part of the link 102 is a rod 116 which is pivoted at its lower end to a treadle 118 (Fig. 7) mounted upon a fulcrum pin 120 supported by the machine frame. The treadle rod 116 is normally urged upwardly by a spring 122, the arrangement being such that during the first part of the downward movement of the treadle 118 the link 102 is swung about the forward end of the lever 106 causing, through the above-described mechanism, the sectors 92 to be moved equal distances toward the central heightwise plane 86 (Figs. 1, 4 and 6) of the machine until limited by a stop 124 (Figs. 1, 4 and 16) which, as will appear later, is initially set in different adjusted positions widthwise of the machine in accordance with the width of the heel 32 in the heel gage 88 (Figs. 2, 4 and 16). Movement of the sectors 92 away from each other along the dovetail guides 94 is limited by the engagement of the treadle 118 with a screw 126 (Fig. 7) which is threaded into the main frame.

The edges 46, 48 (Figs. 6 and 8) of the front and rear crease plates 42, 44 respectively, may be defined as lying approximately in a plane. The front crease plates 42 have at their forward lateral portions thin ledges 128 (Figs. 6 and 8) the upper surfaces 130 of which are arranged approximately in the plane of the edges 46, 48 of the front and rear crease plates. The forward edges of the surfaces 130 of the ledges 128 extend outwardly and forwardly from adjacent corners 132 of the front crease plates which define the forward end of the U-shaped opening, and the rear edges of the surfaces 130 extend outwardly and rearwardly from the adjacent corners 132.

The rear crease plates 44 are formed integral with slide blocks 134 (Figs. 2, 5, 6 and 8) having dovetail portions fitting in guideways 136 (Figs. 1, 5 and 12) of upstanding brackets 138 (Figs. 1, 2, 3 and 5) which have tongues 140 (Figs. 3 and 5) fitting in grooves 142 of the respective sectors 92 and are secured to the sectors by screws 144.

The rear crease plates 44 overlap associated front crease plates 42 to varying extents depending upon the positions of the slide blocks 134 in the guideways 136. Each of the rear crease plates 44 has a thin portion 146 (Fig. 8), the upper face 148 (Figs. 8 and 10) of which is inclined to the plane of the adjacent inner edge 48 and the forward edge 150 of which extends along an inclined face 152 of the adjacent front crease plate 42. Opposing vertical faces 154 of the rear crease plates 44 are usually spaced slightly from each other when the crease plates are in their operative positions, the width of the gap between said faces varying in accordance with the widthwise setting of the pairs of front and rear crease plates. The upper ridges 156 of the rear crease plates 44 are, therefore, higher than the edges 48 of said plates and are on the same level as the upper ridges 158 of the faces 152 of the front crease plates 42. As above stated, the edges 46, 48 of the front and rear crease plates 42, 44 respectively, are arranged approximately in a horizontal plane and form the opening 50 which may be described as having the general shape of the letter U, even though there is always a slight gap between the faces 154 of the rear crease plates 44.

The length of the U-shaped opening 50 may be varied by adjusting the rear crease plates 44 forwardly or rearwardly with relation to the front crease plates 42, the forward edges 150 of the rear crease plates during such movement sliding over the inclined surfaces 152 of corresponding front crease plates. The width of the U-shaped opening 50 may be varied by moving the sectors 92, and with them the corresponding front and rear crease plates 42, 44 respectively, carried by the sectors, equal distances toward and away from the central heightwise plane 86 (Figs. 1, 4 and 6).

Before forcing the central part of the heel-seat portion 30 of the attached sole 32 of the shoe through the U-shaped opening 50, the side margins of said heel-seat portion are clamped against the faces 152 of the front crease plates 42 by the clamp members 52, 54, and the rear margin of the heel-seat portion of the sole is clamped against the faces 148 of the rear crease plates 44 by the clamp members 56. The clamp members 52, 54 and 56 move in response to movement of their associated presser members and, accordingly, the bulger and mechanism for operating the same will be specifically described before describing in detail the clamp members and their operation.

After the knives 72 have been operated to form the heel breast receiving shoulders 74 (Fig. 20) or 76 (Fig. 22) and the margin of the heel-seat portion 30 of the attached sole 32 of the shoe has been forced against the platen 40 by right and left clamp members 52, 54, 56 (Figs. 2, 5 and 10), the bulger which comprises right and left presser or bulger members 58, 60, 62, 64, 66 (Figs. 2, 6, 9 and 10) forces the central part of the heel-seat portion of the sole through the U-shaped opening 50 (Figs. 6 and 8), as shown in Fig. 11.

Each of the front presser members 58 is formed by the lower part of a slide 160 (Figs. 1, 2, 3, 5, 6 and 9) and the presser members 60, 62, 64, 66 are formed by the lower portions of depending slides 162, 164, 166, 168 respectively (Figs. 2, 6, 9, 13 and 14). The slides 168, 166, 164 are mounted for forward and rearward movement along T-shaped guideways 170, 172, 174 (Figs. 13 and 14) respectively, of the adjacent slides, the slide 162 being mounted for forward and rearward movement in a T-shaped guideway 176 of a carrier slide 178 (Figs. 2, 5, 6 and 7). As will appear later, each of the slides 160 is mounted for vertical movement and is also movable together with its associated sector 92 widthwise of the machine but is not movable forwardly or rearwardly of the machine. The slides 162, 164, 166, 168 are interconnected for proportionate adjustment lengthwise of the U-shaped opening 50 (Figs. 6 and 8) by a lever 180 (Figs. 2, 6, 13 and 14) pivoted on a fulcrum pin 182 journaled in the carrier slide 178, the lever having a slot 184 in which are received pins 186 (Figs. 2 and 14) fixed to the respective slides, the arrangement being such that when the right and left presser members 60 are in their forwardmost adjusted positions in contact with associated front presser members 58, the presser members 62, 64, 66 at opposite sides of the machine are in contact with the next forward presser member so that flat horizontally disposed sole engaging surfaces of the right and left presser members form continuous flat surfaces which extend lengthwise of the U-shaped opening 50 and are offset inwardly from the margins respectively, of said opening.

As will appear later, the rear crease plates 44 are in their forwardmost positions with reference to the front crease plates 42 when the sole engaging faces of the right and the left presser members form continuous sole engaging surfaces respectively, the outside edges of each of said surfaces being similar to but slightly smaller than an adjacent margin of the U-shaped opening defined by the edges 46, 48 of the crease plates.

The slides 168 are provided with rearward extensions having vertical flanges 188 (Figs. 2, 6, 9 and 12) slidingly fitting in vertical channels 190 (Figs. 6 and 12) of slides 192 which move along the guideways 136 (Figs. 1, 5 and 12) and, as will appear presently, are adjustably secured to associated blocks 134. It will thus be noted that the slides 168 are movable vertically with relation to the slides 192 but partake of the forward and rearward movement of the slides 192 in order initially to locate the presser members 60, 62, 64 and 66 in different lengthwise operative positions in accordance with the lengthwise positions of the rear crease plates 44. When each of the slides 168 is moved rearwardly one-quarter of an inch, for example, by the slide 192, the presser members 60, 62, 64 and 66 are moved rearwardly one thirty-second, one-sixteenth, one-eighth and one-quarter of an inch respectively, the effective length of the bulger being increased by approximately one-quarter of an inch.

The bulger may, therefore, be described as comprising two rows of presser members 58, 60, 62, 64 and 66 having flat sole enegaging faces normally arranged above the opening and offset inwardly from the lateral margins of the opening, the outer peripheries of said sole engaging faces having the general shape of the letter U. It will be appreciated that when the slides 168 are moved rearwardly the presser members 60, 62, 64 and 66 of each row are adjusted rearwardly of the U-shaped opening, the effective length of the rows varying in accordance with variations in the length of said opening.

The vertical slides 160 are movable along guideways 194 (Figs. 5 and 6) of the carrier slides 178 respectively, which have dovetail ribs 196 fitting in dovetail guideways 198 of the associated brackets 138 (Figs. 1, 2, 3 and 5). Each of the carrier slides 178 is normally held in its raised inoperative position by a spring 200, the upper end of which embraces a pin 202 secured to the associated bracket 138 and the lower end of which is secured to a pin 204 which is threaded into the carrier slide and passes through an elongated vertical slot 206 formed in the bracket. Each of the vertical slides 160 has a slot 208 (Figs. 2, 3 and 5) in which registers a pin 210 secured to and extending in opposite directions from a power-operated lever 212 pinned to a fulcrum pin 214 (Fig. 2) which is supported by the machine frame and has secured to it an arm 213 connected by a link 216 to a bell-crank lever 218 (Figs. 1 and 2) pivoted upon a fulcrum pin 220 carried by the machine frame. The upper arm of the bell-crank lever 218 carries a block 222 (Fig. 2) fitting in a vertical groove 215 of a slide 217 movable forwardly and rearwardly along a guideway 219 (Fig. 1) of the machine frame. Carried by the slide 217 is a cam roll 221 fitting in a groove (not shown) of a barrel cam 224 mounted upon a main drive shaft 226 which is actuated by a one-revolution clutch (not shown) tripped by depressing a hand lever 228.

When the machine is at rest the vertical slides 160 are held in their raised inoperative positions by the lever 212, upward movement of the carrier slides 178 under the action of the springs 200 being limited by any suitable means such, for example, as the engagement of the pins 204, which are threaded into the carrier slides 178, with the upper ends of the slots 206. When the carrier slides 178 are in their raised inoperative positions, their upper ends are arranged adjacent to lateral projections 223 of a treadle operated lever 225 through which said slides are depressed, as will appear presently.

As above stated, before the central part of the heel-seat portion 30 of the attached sole 32 positioned upon the platen 40 (Fig. 8) is forced through the U-shaped opening 50 (Figs. 6 and 8), as shown in Fig. 11, the margin of said heel-seat portion is forced with considerable pressure against the faces 152 of the front crease plates 42 and the faces 148 of the rear crease plates 44. The clamp for forcing the margin of the heel-seat portion 30 of the sole 32 against the platen 40 comprises the right and left pairs of front, intermediate and rear clamp members 52, 54, 56 (Figs. 2, 5 and 10) respectively, which will now be described in detail.

Each of the front clamp members 52 has a cylindrical stem 234 (Figs. 1, 3, 5 and 6) fitting in a vertical bore 236 (Fig. 6) of a corresponding vertical slide 160 and is constantly urged downward by a spring 238, downward movement of the clamp member being limited by a screw 240 which is threaded into the vertical slide and is engaged by a shoulder 242 of the cylindrical stem 234. The bottom or sole engaging surface of each of the front clamp members 52 comprises faces 244, 246, 248 (Fig. 9A) which are complemental to and overlie portions of the surfaces 130, 152 and 250 (Fig. 6) respectively, of an associated front crease plate 42. It will be noted that when the machine is at rest the front clamp members 52 extend slightly below the adjacent front presser members 58.

The intermediate clamp members 54 (Figs. 1, 5, 9 and 10) are carried by the right and left slides 164 respectively, the serrated sole engaging face 252 of each of the clamp members being inclined at the same angle as the central part of the face 152 of the associated front crease plate 42 over which it is positioned. Each of the intermediate clamp members 54 has a cylindrical stem 254 (Fig. 9) fitting in a bore 256 of a cylindrical extension 258 of the slide 164, and located in said bore is a spring 260 which constantly urges the clamp member 54 downward until a shoulder (not shown) of the stem 254 engages a stop screw 262 threaded into the extension 258, the arrangement being such that the inner lower portion of the clamp member 54 projects slightly below the sole engaging faces of adjacent presser members 60, 62, 64 when the machine is at rest.

The rear clamp members 56 are mounted upon fulcrum pins 264 (Figs. 1, 2 and 6) threaded into the slides 192 which, as above stated, fit in the dovetail guideways 136 behind the associated slide blocks 134 which carry the respective rear crease plates 44. The slide 192 and the slide block 134 at each side of the machine are secured together by a screw 266 (Figs. 1, 2, 5 and 6) which fits in a channel 268 (Fig. 6) in the outer side of the slide block and has shoulders in engagement with the front and rear ends respectively, of the block, the rear end portion of the screw 266 being threaded into the associated slide 192. The screw 266 is held in its adjusted position by a spring 270 interposed between the head of the screw and the slide block 134. It will thus be clear that the forward and rearward operative positions of the rear clamp members 56 may be initially varied with relation to their associated rear crease plates 44 by turning the screws 266.

When the machine is idle each of the rear clamp members 56 is forced against a lug 272 (Figs. 2 and 12) of a bracket 274 (Figs. 2, 6 and 12), which is secured by screws 276 to an associated carrier slide 178, by a spring pressed plunger 278 (Figs. 2 and 12) slidable in a bore 280 (Fig. 12) of the bracket, the arrangement being such that the forward end of a serrated sole engaging face of the rear clamp member 56 is normally arranged slightly below the sole engaging face of an associated rear presser member 66, as best shown in Fig. 2.

The shoe centralizing gage 87 is slidable forwardly and rearwardly along a guideway 282 (Figs. 1 and 2) of the counter gage 89 and is normally held in its inoperative position in advance of the counter gage by a spring 284 (Fig. 2), forward movement of the centralizing gage with relation to the counter gage being limited by the engagement of a shoulder of the centralizing gage with a screw 286 carried by the counter gage. It will be noted at this point that the counter gage 89 is operatively connected, by mechanism which will be described later, to an abutment 287 (Figs. 2, 4, 15 and 16) which measures the heel 36 in the gage 88 lengthwise, the counter gage being moved forwardly and rearwardly along the guideway 91 (Figs. 1, 2 and 15) into different adjusted positions to the same extent that the blocks 134 are moved along their respective guideways 136.

After forcing the rear counter portion of the shoe 34 against the centralizing gage 87 and then against the counter gage 89 to position the heel-seat portion 30 of the attached sole 32 of the shoe 34 upon the crease plates 42, 44 with its heel breast line 288 (Figs. 19 and 20) in alinement with the corners 132 (Figs. 6 and 8) of the front crease plates 42, the operator depresses the treadle 118 (Fig. 7) causing the sectors 92 to be moved inwardly until a screw 290 (Figs. 1, 4 and 16) threaded into the bracket 138 secured to the right sector 92 engages the above-mentioned stop 124 which, as will appear later, is set in different adjusted positions widthwise of the machine in accordance with the width of the heel 36 in the heel gage 88. The sectors 92, which are movable equal distances in opposite directions along the dovetail guides 94, are thus located in different operative positions widthwise of the machine in accordance with the width of the measured heel 36 in the gage 88, and accordingly, the width of the opening 50 formed by the front and rear crease plates 42, 44, as well as the effective width of the bulger and clamp, is varied in accordance with the width of the measured heel.

During the latter part of the depression of the treadle 118 (Fig. 7), the lever 102 is rotated about its pivotal connection with the lower end of the sector operating rod 98 (Figs. 1, 2 and 7) causing a link 296 (Figs. 2 and 7), which is connected to the lever 110 by the fulcrum pin 112, to be raised. The upper end of the link 296 is pivoted to the rear end of a lever 298 which is pinned to one end of a shank 300 mounted for rotation in the main frame. To the other end of the shaft 300 is pinned the lever 225, the lateral projections 223 of which overlie the upper ends of the carrier slides 178. It will, therefore, be clear that, after the inward movement of the sectors 92 has been limited by the stop 124, further depression of the treadle 118 causes the projections 223 of the lever 225 to force the carrier slides 178 downward, thereby causing the right and left clamp members 54, 56 to force the margin of the heel-seat portion 30 of the attached sole of the shoe positioned in the machine against the crease plates 42, 44 and also causing the bulger members 60, 62, 64 and 66 to be moved downwardly into engagement with the heel-seat portion of the sole.

As will be described later, means for guiding and operating the shoulder forming knives 72 are mounted upon the respective sectors 92, the construction and arrangement of said means being such that, irrespective of the widthwise setting of the sectors, the knives 72 move inwardly during their shoulder forming strokes until the lower corners 306 (Figs. 1, 5 and 6) of their cutting edges 308 arrive approximately at the forward corners 132 of the front crease plates 42.

In order to insure that the shoulder forming knives 72 during their operation shall not engage the front clamp members 52 or the front presser members 58, the heel breast receiving shoulders 74 (Fig. 20) or 76 (Fig. 22) are formed after the slide carriers 178 have been depressed by the lever 225 but before the vertical slides 160 have been lowered by the power-operated lever 212. After the heel breast receiving shoulders 74 or 76 have been formed, the forward end of the power-operated lever 212 is lowered causing the front clamp members 52 to force the forward lateral margins of the heel-seat portion 30 of the sole 32 against the front crease plates 42 and then causing the front bulger members 58 to be brought down into engagement with the sole. When the flat sole engaging faces of the front presser members 58 have been moved downwardly into alinement with the flat sole engaging faces of the presser members 60, 62, 64, 66, a face 309 (Fig. 2) of the vertical slide 160 is in engagement with a face 311 of the carrier slide 178, continued downward movement of the forward end of the lever 212 causing all the presser members operating as a unit to force the central part of the heel-seat portion 30 of the sole 32 through the U-shaped opening 50 and below the approximately flat lower faces 68, 70 of the crease plates. The presser members come to rest when the sole engaging faces of the same are arranged approximately in alinement with the lower face of the platen.

After the margin of the heel-seat portion 30 of the attached sole 32 of the shoe 34 has been clamped against the crease plates 42, 44, and the central part of said heel-seat portion has been bulged through the U-shaped opening 50, as above described, the heel-seat reducing or back knife 78 is moved forwardly with its cutting edge 80 in engagement with the approximately flat lower faces of the crease plates to reduce the heel-seat portion of the sole forwardly to the previously formed heel breast receiving shoulders 74 (Fig. 20) or 76 (Fig. 22), thereby forming the heel-seat tab 82 (Fig. 20) or 84 (Fig. 22).

The back knife 78 has transversely extending lugs 310 (Figs. 1, 2 and 11) fitting in channels formed in lateral upstanding flanges of a knife carrier 312 which is mounted for movement along a forwardly and rearwardly extending guideway 314 of the machine frame. The knife 78 may be secured in different adjusted positions to the knife carrier 312 by a screw 316 (Figs. 2 and 6) which has a collar 315 fitting in a recess 317 (Fig. 6) of the knife carrier and which is threaded into a block 318 (Fig. 2) mounted upon a fulcrum pin 320 secured to the knife carrier. The block 318 is held in its operative position shown in Fig. 2 by a latch 322 which is pivoted at its lower end to the knife carrier 312 and has a lip 324 normally held in overlying relation with the block by a spring 326. When it is desired to remove the knife 78 from the knife carrier 312, the latch 322 is swung forwardly against the action of the spring 326, and the block 318 is swung in a clockwise direction about the fulcrum pin 320 causing the collar 315 of the screw 316 to be withdrawn from the recess 317. It will thus be appreciated that the knife 78 may be readily removed from the machine for the purpose of sharpening the same or substituting therefor a differently shaped knife, in accordance with the type of work being operated upon in the machine.

The bottom of the knife carrier 312 has a rack 328 meshing with a pinion 330 rotatably mounted upon a pin 332 secured to a slide 334 (Figs. 1 and 2) carrying a cam roll 336 which fits in a groove (not shown) of the barrel cam 224. The pinion 330 meshes with a rack 338 fixed to the machine frame, the arrangement being such that the pinion 330 is driven to and fro through a fixed stroke when the cam 224 is rotated, the knife 78 being driven through twice the stroke of the pinion. The stroke and the initial setting of the knife 78 in the knife carrier 312 is such that the knife moves forwardly until its cutting edge 80 advances slightly ahead of the forward corners 132 (Figs. 6 and 8) of the crease plates, thereby insuring that the heel-seat reducing cut shall intersect cuts previously made by the shoulder forming knives 72. The knife 78 is then moved rearwardly to its retracted starting position shown in Fig. 2.

The mechanism for operating the shoulder forming knives 72 will now be described. Mounted upon each of the sectors 92 is a dovetail guide 340 (Figs. 1, 3 and 5) having a depending arcuate lip 342 (Figs. 5 and 6) fitting in an arcuate channel 344 formed in the upper face of the sector 92. Fitting in a T-shaped groove 346 (Fig. 5) of each of the guides 340 is a T-shaped block 348 pivoted to a link 350 the inner end of which is pivoted to a binding block 352 (Fig. 6) fitting in an arcuate channel 354 (Figs. 1, 5 and 6) formed in the upper face of the sector 92. A screw 356 is threaded into each of the blocks 348, the inner end of the screw normally engaging an undercut arcuate face 358 of the sector 92. The arcuate channels 344, 354 and the arcuate face 358 of each sector 92 are centered about an axis 360 (Figs. 5 and 6) which is disposed at right angles to a horizontal plane extending along the lower faces 68, 70 of the crease plates 42, 44 and passing approximately through the corner 132 of an associated front crease plate 42, the arrangement being such that the dovetail guide 340 may be adjusted upon the sectors 92 about the axes 360 respectively, in accordance with the desired angular paths of movement of the knives 72 toward and away from the central heightwise plane 86 of the machine.

The guides 340 may be secured in different angular positions upon their respective sectors 92 by forcing the inner ends of the screws 356 (Figs. 1, 3 and 5) against the arcuate faces 358 of the sectors 92, thereby moving the blocks 348 outwardly and pulling the binding blocks 352 against undercut faces 362 respectively, of the arcuate channels 354, the screws 356 and the binding blocks 352 together serving to secure the dovetail guides 340 against movement with relation to the sectors.

Formed at the under sides of knife carrier slides 364 are dovetail channels for receiving the respective dovetail guides 340, and secured by screws 366 to the inner ends of the carrier slides are knife holders 368 (Figs. 1 and 5) having ribs fitting in arcuate channels 370 of the carrier slides. Each of the arcuate channels 370 is centered about a horizontal axis 372 (Figs. 5 and 6) which extends lengthwise of the corresponding dovetail guide 340 and passes through the lower corner 306 of the cutting edge 308 of the associated shoulder forming knife 72 and also approximately through the corner 132 of the associated front crease plate 42. Each of the knives 72 is secured to its associated holder 368 by a clamp lever 374 pivoted on a fulcrum pin 376 secured to the holder and having threaded into it a screw 378 through which the knife may be quickly secured to and removed from the holder. After releasing the screws 366 which are threaded into the associated knife holders 368 and pass through arcuate slots 380 in the carrier slides 364, the knives 72 may be initially set in different angular positions about the respective axes 372 in accordance with the desired angle at which the heel breast receiving shoulders 74 (Fig. 20) or 76 (Fig. 22) are to be disposed to the bottom of the sole of the shoe.

Each of the knife carrier slides 364 has in its outer upper surface a dovetail guideway 382 in which freely slides a block 384 (Figs. 1, 3 and 5) carrying a fulcrum pin 386 to which is connected the outer end of a link 388. The inner end of the link 388 is pivoted to the forward arm of a bell-crank lever 390 which is pivoted on an upstanding fulcrum pin 392 secured to a lug 394 which may be initially secured in different adjusted positions to its corresponding sector 92. The rear arm of each of the bell-crank levers 390 is connected for universal movement to the forward end of a link 396 (Figs. 1, 5 and 18).

Secured to each of the links 388 at opposite sides of the machine is a depending stud 398 (Figs. 1 and 5) to which is pivoted an outer end portion of a short link 400, the inner portion of the short link being pivoted to a fulcrum pin 402 (Fig. 1) threaded into the associated carrier slide 364.

Each of the lugs 394 (Figs. 3 and 5) has a groove 404 (Fig. 5) for receiving a rear end portion of the corresponding sector 92 and an elongated slot 406 for receiving a binding screw 408 (Figs. 3 and 5) threaded into the sector. In order to facilitate the initial positioning of each of the lugs 394 upon its associated sector 92 there is provided a screw 410 which is threaded into the lug 394 and has a collar 412 (Fig. 5) fitting in a channel 414 of the sector. After the lug 394 has been accurately adjusted upon the sector 92 by the use of the screw 410, the binding screw 408 is tightened to secure said lug in its adjusted position to the sector.

The links 396 which operate the bell-crank levers 390 are connected for universal movement to the upper ends of compound levers 416 (Figs. 1, 2 and 18) mounted on fulcrum pins 418 supported by the machine frame. The lower ends of the levers 416 are pivoted to slides 420 which are mounted for forward and rearward movement along guideways 422 respectively, of the machine frame. The slides 420 carry cam rolls 424 respectively fitting in a common groove (not shown) of the barrel cam 224. It will be noted that by operatively connecting the links 396 to different slides 420 having cam rolls 424 fitting in the common cam groove, one of the shoulder forming knives 72 is moved inwardly before the other, thereby insuring that the knives shall not engage each other at the inner ends of their cutting strokes.

During the operation of the machine the links 396 are pulled rearwardly and are then returned to their initial positions, the knives 72 moving one before the other toward the central heightwise plane 86 of the machine until the lower corners 306 of their cutting edges 308 have been moved inwardly to points just above the corners 132 (Figs. 6 and 8) respectively, of the front crease plates 42, and then back to their starting positions, the construction and arrangement of the mechanism for guiding and operating the knives being such that the lengths of the cutting strokes of the knives 72 are substantially constant irrespective of the widthwise positions of the sectors 92 or the angles at which the dovetail guides 340 are adjusted upon the sectors.

Since the operative positions of the sectors 92 along the dovetail guides 94 (Figs. 1, 2, 5 and 7) may be varied in accordance with the width of the measured heel 36 in the gage 88, and each sector carries one of the front and one of the rear crease plates 42, 44 respectively, the width of the U-shaped opening 50 also is varied in accordance with the width of the heel, the associated right and left clamp members 52, 54, 56 and the presser members 58, 60, 62, 64, 66 moving together with the sectors and being maintained in the same operative positions with relation to the crease plates irrespective of the widthwise positions of the sectors. Moreover, since the shoulder forming knives 72 and the mechanism for operating the same are carried by the sectors 92, the arrangement is such that irrespective of the widthwise operative positions of the sectors, the shoulder forming knives always move inwardly until the lower corners 306 of their cutting edges 308 are located just above the corners 132 of the respective front crease plates 42.

It will be noted that throughout the operation of the machine the corners 132 of the front crease plates 42 lie in a straight line 426 (Fig. 6) extending transversely of the machine, the counter gage 89 (Figs. 1, 2 and 6) always being so positioned that the heel breast line 288 (Figs. 19 and 20) of the attached sole of the shoe being operated upon in the case of regular Louis work, for example, extends along the line 426.

In order that the shoe 34 shall be accurately positioned lengthwise in the machine, the counter gage 89 (Figs. 1 and 2) is initially positioned along its guideway 91 in accordance with the position of the abutment 287 of the heel gage 88. Moreover, as above stated, in order to vary the length of the heel-seat tab 82 (Fig. 20) or 84 (Fig. 22) in accordance with the length of the heel in the heel gage 88, the length of the U-shaped opening 50 (Figs. 6 and 8) is varied by sliding the rear crease plates 44 over their associated front crease plates 42, the operative positions of the clamp members 54, 56 and the presser members 60, 62, 64, 66 also being varied lengthwise of the opening in accordance with variations in the operative positions of said abutment 287 of the heel gage 88.

The heel gage 88 comprises a platform 428 (Figs. 2, 4 and 16) which is secured to the machine frame and has a flat upper surface. The heel 36 is placed attaching face down and breast forward upon the platform 428, the rim 430 of the attaching face of the heel, which rim lies in a plane, being in engagement with the flat upper surface of the platform. The heel gage 88 is quite similar to a heel gage disclosed in an application for United States Letters Patent, Serial No. 218,655, filed July 11, 1938, in my name, and comprises a stationary breast gage 432 (Figs. 2 and 4) which may be initially adjusted forwardly and rearwardly in a guideway 434 (Fig. 4) formed in the platform 428 by turning a screw 436 which is journaled in an upwardly extending lip of the platform and is threaded into the breast gage.

In order quickly and effectively to centralize the heel 36 in the heel gage 88 there is provided a slide 438 which is constantly urged forwardly along a guideway 440 (Fig. 4) by a spring 442, forward movement of the centralizing slide being limited by the engagement of a screw 444 carried by the slide with a shoulder 445 (Fig. 2) of the abutment 287 (Figs. 2, 4, 15 and 16). Slidable in a guideway 446 (Figs. 4 and 16) in the centralizing slide 438 is the abutment 287 which, as above stated, measures the heel lengthwise and has at its lower face a rack 448 (Figs. 2, 15 and 16) meshing with a pinion 450 which is carried by a block 452 slidable forwardly and rearwardly in a guideway 454 (Figs. 2 and 4) of the machine frame. The pinion 450 also meshes with a rack 456 formed at the upper side of an actuator slide 458 movable forwardly and rearwardly in a guideway 460 and having pivoted to its forward end a pair of links 462 (Figs. 2, 4 and 16) connected through fulcrum pins 464 (Fig. 16) to upper abutments or arms 465 of levers 466 which are pivoted upon fulcrum pins 470 secured to the machine frame. The arrangement of the mechanism just described is such that when the actuator slide 458 is moved rearwardly along its guideway 460 the inner ends of the upper arms 465 of the levers 466 are swung apart to enable the operator to place the heel upon the platform 428, and when the actuator slide 458 is moved forwardly the arms 465 are swung toward each other into engagemnt with the opposite sides of the heel positioned in the heel gage 88 to measure the heel widthwise. The abutment 287 has in its upper surface a recess 474 (Fig. 4) in which fits a collar 476 (Figs 2 and 4) of a screw 478 threaded into an upstanding post 480 (Figs. 2, 4 and 15) secured to the rear end of a slide 482 movable forwardly and rearwardly in a guideway 484 of the machine frame.

A lower arm 486 (Fig. 16) of the right lever 466 is pivoted through a pin and elongated slot connection 487 to the inner end of a slide bar 488 (Figs. 4 and 16) which is movable widthwise of the machine in a guideway 489 and has a slot 490 in which fits a pin 491 secured to the main frame. The slide bar 488, as will appear later, carries the stop 124 (Figs. 1, 4 and 16) for limiting inward movement of the sectors 92.

The pinion carrier block 452 (Figs. 2, 4, 15 and 16) has a slot 492 (Figs. 4, 15 and 16) in which fits a pin 493 secured to and projecting from the upper end of an offset bell-crank lever 494 (Figs. 2, 3, 4 and 15) which is pivoted in the main frame about an axis 495. Pivoted to the lower arm of the offset bell-crank lever 494 is a link 496 the central portion of which is pivoted to the upper end of a rod 497. The lower end of the rod 497 is pivoted to a treadle 498 (Fig. 15), the extreme upward movement of which under the action of a strong spring 500 may, if desirable, be limited by a stop 499. A comparatively weak tension spring 501 has its upper end connected to the rear end of the link 496 and its lower end connected to the machine frame, the arrangement being such that when the machine is at rest (there being no heel in the machine), the bell-crank lever 494 is held in its extreme counterclockwise position, as viewed in Figs. 2 and 15 (clockwise, as viewed in Fig. 3) through the provision of the spring 501, which, as will appear later, enables the treadle rod 497 operating through the link 496 to swing the bell-crank lever 494 in a counterclockwise direction during the first part of the upward movement of the treadle from a depressed position.

Inward movement of the upper arms 465 (Fig. 16) of the lever 466 (there being no heel in the machine) is limited by the engagement of the outer end of the slot 493 formed in the slide bar 488 with the pin 491, and forward movement of the abutment 287 is limited by the engagement of the rear ends of recesses 502 (Figs. 4 and 15) formed at the opposite sides of the slide 482 with hub portions of the levers 466.

Pivoted on the link 496 between the spring 501 and the treadle rod 497 is a link 503 which, as will appear later, operates mechanism for locating the rear crease plates 44, the clamp members 54, 56, the presser members 60, 62, 64, 66 and the counter gage 89 in different operative positions lengthwise of the machine in accordance with the position of the abutment 287. During the first part of the depression of the treadle 498, the offset bell-crank lever 494 remains stationary, the link 496 turning in a clockwise direction, as viewed in Figs. 2 and 15, about its pivotal connection with the lower arm of the bell-crank lever. The link 503 then comes to a stop, as will appear later, further depression of the treadle 498 causing the bell-crank lever 494 to pivot in a clockwise direction, as viewed in Figs. 2 and 15, about the axis 495, thereby causing, through the above-described mechanism, the upper arms 465 of the levers 466 to be moved outwardly and the abutment 287 to be moved rearwardly so as to enable the operator to place upon the platform 428 a heel which is to be attached to the shoe about to be operated on by the machine. When the heel has been positioned in the machine, the offset bell-crank lever 494 is rotated in a counterclockwise direction, as viewed in Figs. 2 and 15, causing the pinion 450 carried by the block 452 to move the abutment 287 and the actuator slide 458 forwardly together until said abutment engages the rear end of the heel. The abutment 287 then comes to rest but the block 452 continues to travel forwardly, therby moving the actuator slide 458 forwardly until the upper arms 465 of the lever 466 engage the sides of the heel.

As above stated, in order to limit inward movement of the sectors 92 in accordance with the width of the measured heel 36 in the heel gage 88, there is provided the stop 124 (Figs. 1, 4 and 16) which is engaged by the adjustable screw 290 and is operatively connected to the right lever 466 (Figs. 4 and 16) by mechanism which will now be described.

The slide bar 488 through which inward movement of the arms 465 of the levers 466 is limited, has pivoted to it by a fulcrum pin 504 the stop 124, opposite walls of a channel 506 of which are in engagement with the front and rear faces of a locking bar 507 pivoted upon the pin 491.

When the actuator slide 458 is moved forwardly causing the arms 465 of the levers 466 to be moved equal distances toward and into engagement with the opposite sides respectively of the heel 36 in the heel gage 88, the slide bar 488 moves inwardly along its guideway 489, the walls of the channel 506 sliding along the front and rear faces respectively, of the locking bar 507. It will, therefore, be appreciated that when inward pressure is exerted against the stop 124 by the screw 290, said stop is cramped against the locking bar 507, thereby preventing further inward movement of the sectors 92.

As disclosed in said Letters Patent No. 1,847,244, it is sometimes desirable in the manufacture of shoes having Louis heels to form upon the sole of the shoe the undercut heel breast receiving shoulders 76 (Fig. 22) which extend inwardly and forwardly from the lateral edges of the sole and in the finished shoe are engaged by the shoulders 35 (Fig. 23) of the modified Louis heel 38.

In order to form the shoulders 35 upon Louis heels, the illustrative machine is provided with a pair of knives 518 (shown in dash lines in Figs. 4 and 17) which are movable inwardly from the opposite sides of the heel 36 in the heel gage 88 and are operated through mechanism which will now be described. The right and left knives 518 and the mechanism for operating and guiding the same are reversed but practically identical. Formed in the machine frame are guideways 520 (Figs. 2 and 17) disposed at right angles to the central heightwise plane 86 of the machine and fitting in said guideways are tongues of associated carrier plates 522 (Figs. 4 and 17), each having an upstanding arcuate dovetail rib 524 shaped to fit in an arcuate dovetail groove at the under side of a guide or guide block 526. The guide blocks 526 may be angularly adjusted upon their associated carrier plates 522 about axes 528 which are disposed at right angles to the plane of the rim 430 of the attaching face of the heel 36 positioned in the heel gage 88 and extend approximately along the forward end of the forwardly projecting lip of the breast of the heel in the vicinity of the inner ends respectively, of the shoulders 35, which shoulders, as will appear later, for a given style of heel and angle of cut are of uniform width irrespective of the width of the heel. It will be noted that the axes 528 which are disposed at right angles to the plane of the rim 430 of the attaching face of the heel may, if desirable, pass through the inner ends respectively, of the shoulders 35 or may pass through the inner limits of movement of the lower corners of cutting edges 529 of the knives 518. Each of the guide blocks 526 is secured in its angularly adjusted position to its associated carrier plate 522 by a screw 530 which is threaded through a depending lug of the guide block and normally has its end in forced engagement with an undercut arcuate face 532 of the carrier plate.

Formed in each of the guide blocks 526 is a straight dovetail guideway 534 in which fits a slide 536. Passing through alined slots 538, 540 in the slides 536 and the guide blocks 526 respectively, is a threaded projection 541 forming part of an arcuate guideway piece 544 which is secured to the slide 536 by a sleeve and nut connection 542. The arcuate guideway piece 544 is positioned in a recess 546 at the under side of the guide block 526 and has an arcuate groove 548 which is centered about the corresponding axis 528 (which, as will appear later, is fixed with reference to the guide block) when the associated knife 518 is at the inner limit of its cutting stroke. The slide 536 has a bore 550 for receiving two semi-cylindrical members 551 into one of which is threaded a screw 552 extending through a slot 553, the knife being clamped between one of the members and the screw. Each of the knives 518 may be initially adjusted lengthwise of the bore 550 and also about the axis of the bore.

Each of the slides 536 is actuated through a roll 554 fitting in the associated groove 548 and carried by the forward arm of a bell-crank lever 556 which is pivoted upon a fulcrum pin 558 (Fig. 4) secured to a corresponding carrier plate 522 and has its rear arm universally connected by a link 560 (Figs. 2 and 4) to a lever 562 keyed to a shaft 564 journaled in the machine frame. Formed integral with the right lever 562 is a lever 566 connected by a link 568 (Figs. 2 and 18) to a rearwardly extending arm of the right compound lever 416 which, as above described, is pivoted to the right slide 420 through which the righthand shoulder forming knife 72 is operated, the arrangement being such that the heel trimming knives 518 execute their cutting strokes together and simultaneously with the right shoulder forming knife 72.

It is desirable that the shoulders 35 (Fig. 23) at the upper breast margins of the modified Louis heel 38 shall be approximately complemental to the associated heel breast receiving shoulders 76 (Fig. 22) and, accordingly, the dovetail guideways 534 of the guide blocks 526 (Figs. 4 and 17) and the dovetail guides 340 (Figs. 1, 3 and 5) are disposed at corresponding angles to the central heightwise plane 86 of the machine. In order to facilitate the initial setting of the guide blocks 526 and the guides 340 upon the carrier plates 522 and the sectors 92 respectively, the upper faces of the carrier plates and the sectors are provided with graduations 570 (Figs. 4 and 17), 572 (Fig. 5) respectively.

Each of the carrier plates 522 is provided with a depending lug 574 (Figs. 1, 5 and 17) having a bore in which a collared screw 576 is rotatably mounted, the inner end of the screw being threaded into a recess formed in the upper end of the associated bracket 138. A set screw 578 is provided for retaining each of the screws 576 in its adjusted position in the bracket 138. It will thus be clear that the carrier plates 522 together with their associated sectors 92 move equal distances in opposite directions toward and away from the central heightwise plane 86 of the machine, with the result that the relative positions of the sides of heels of different sizes, and the starting positions of the knives are approximately the same irrespective of the size of the heel, assuming, of course, that the angles of cut are the same. Accordingly, for any given angle of cut the shoulders 35 (Fig. 23) formed on heels of different sizes will always be of approximately the same width.

The link 503 (Figs. 2, 3 and 15) which is operatively connected through the link 496 to the treadle operated rod 497 is pivoted to a rear arm of a bell-crank lever 584 which is freely pivoted upon a shaft 586 journaled in the machine frame and is formed integral with a gear segment 588. On a depending arm of the bell-crank lever 584 is mounted a roll 590 (Fig. 3) fitting in a groove 592 of a slide 594 (Figs. 1, 3 and 15) mounted for forward and rearward movement in a guideway 596 at the left side of the machine frame. The slide 596 has secured to it an inwardly extending pin 598 (Figs. 1 and 15) an inner portion of which fits in a slot of a rearward extension of the counter gage 89.

Secured to the left end of the shaft 586 is a short arm 600 (Figs. 3 and 15) having a block 602 pivoted thereto and journaled in the block is an adjusting screw 604 the rear portion of which is threaded into a block 606 pivoted to an offset lug 608 of the bell-crank lever 584, the arrangement being such that rotation of the bell-crank lever 584 is imparted to the shaft 586 but said shaft may be initially adjusted with reference to said lever. The shaft 586 has also secured to it depending gear segments 610 meshing with wide racks 612 of the respective slides 192 which are thus coupled for movement together along their guideways 136. As above explained, the slides 192 are operatively connected to corresponding rear crease plates 44, rear clamp members 56, and rearward extensions of the slides 168.

A laterally projecting stop 616 which is pivotally supported by the slide 482 through a fulcrum pin 617 (Fig. 15) has a channel 618 the side walls of which engage the sides respectively, of a locking bar 620 pivoted upon a pin 622 secured to the machine frame. Meshing with the gear segment 588 is another gear segment 624 which is freely mounted upon a fulcrum pin 626 carried by the machine frame and is formed integral with an upstanding arm 628 shaped and arranged to engage the stop 616.

Figure 15:
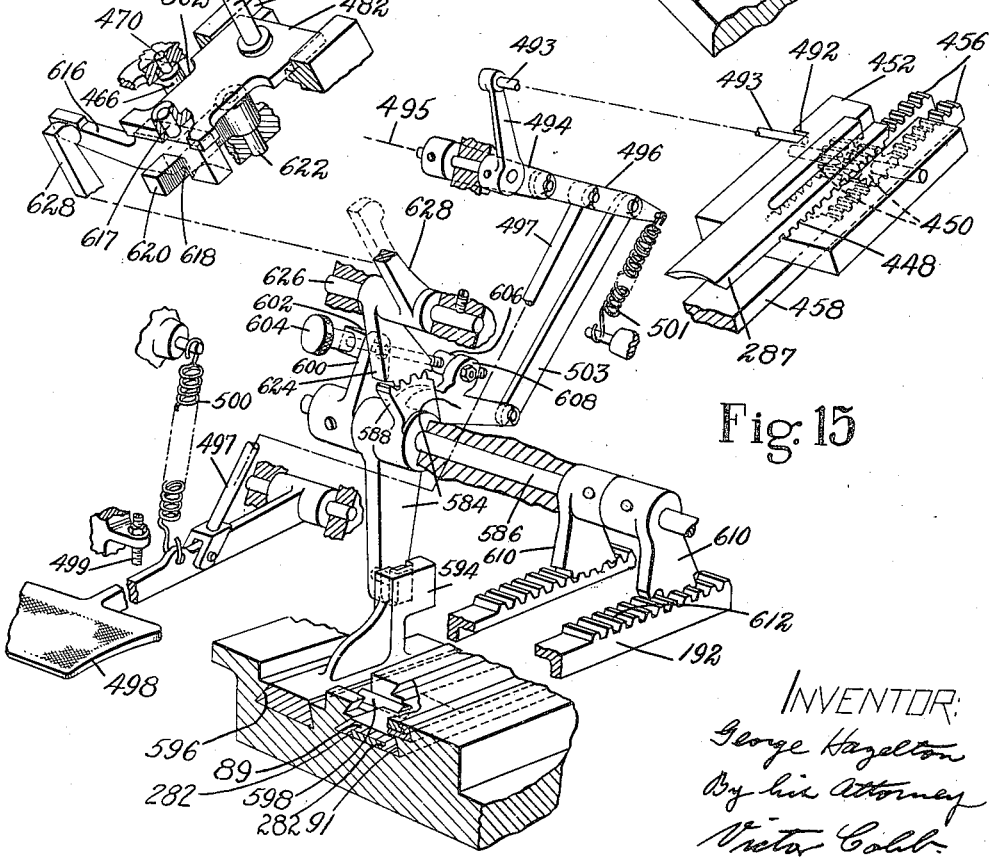
Fig. 15 is a skeleton view showing connections between an abutment which measures the heel in the heel gage lengthwise and various slides through which the rear crease plates, the two rear clamp members, the four rear presser members, and a counter gage are moved into different operative positions lengthwise of the machine in accordance with the setting of said abutment.

In the use of the machine, the operator first depresses the treadle 498 (Fig. 15) against the action of the strong spring 500 causing the rod 497 (Figs. 2 and 15) to swing the link 496 in a clockwise direction, as viewed in Figs. 2 and 15, about the lower arm of the offset bell-crank lever 494 which at this time is held against rotation by the spring 501, and thus, through the above-described mechanism, swinging the arm 628 forwardly away from the stop 616. At the same time the depending arm of the bell-crank lever 584 swings forwardly causing, through mechanism above described, the counter gage 89 to move forwardly along its guideway 91 and the slides 192 to travel forwardly along their respective guideways 136. When the presser members 60 which move forwardly in response to movement of the slides 192 engage the front presser members 56, the link 503 ceases to move downwardly. As the treadle rod 498 is further depressed, the link 496 is swung in a counter-clockwise direction about its pivotal connection with the link 503 causing the bell-crank lever 584 to move the pinion carrying block 452 rearwardly along its guideway 454 with the result that the abutment 287 is moved rearwardly and the arms 465 of the compound levers 466 are swung apart.

Rearward movement of the actuator slide 458 is limited by the engagement of the inner end of the slot 490 (Fig. 16) of the slide bar 488 with the pin 491, and rearward movement of the abutment 287 and the slide 482 is limited by contact of the forward ends of the recesses 502 of said slide 482 with the hubs of the levers 466.

The heel which is to be attached to the next shoe to be operated upon is then forced against the notched portion of the centralizing slide 438 (Figs. 2 and 4) causing the slide to be moved rearwardly against the action of the spring 442 until the heel can be placed attaching face down upon the platform 428. The operator then releases the heel which is forced against the breast gage 432 and centralized in the machine by the spring operated slide 438.

The operator then releases the treadle 498 causing the abutment 287 to be moved forwardly into engagement with the rear end of the heel and causing the arms 465 (Fig. 16) of the levers 466 to be swung into engagement with opposite sides of said heel, thereby causing the stops 124 (Figs. 1, 4 and 16) and 616 (Figs. 3 and 15) to be moved into correlated positions along the locking bars 507 and 620 respectively.

The bell-crank lever 494 now comes to rest, further upward movement of the treadle rod 498 causing the link 496 to be rotated in a counterclockwise direction, as viewed in Figs. 2 and 15, about its pivotal connection with the bell-crank lever 494 until the arm 628 engages the stop 616. When rearward pressure is exerted against the stop 616, the walls of the channels 618 are immediately cramped against the opposite sides of the locking bar 620, thereby preventing any further rearward movement of the arm 628. At the same time the slides 192, 594 which are operatively connected to the arms 628 through the above-described mechanism, are moved along their guideways 136, 596 respectively, and accordingly, the counter gage 89, the clamp members 54, 56, the presser members 60, 62, 64, 66 and the rear crease plates 44 are positioned simultaneously in their lengthwise operative positions in accordance with the length of the measured heel in the gage.

The shoe is now presented to the machine sole upward and heel end first, the heel-seat portion 30 of the sole 32 overlying the crease plates 42, 44. The shoe is brought into engagement with the centralizing gage 87 and is then moved rearwardly together with the centralizing gage until the rear end of the shoe engages the counter gage 89. When the shoe is forced against the counter gage 89, the stop 616 is cramped with further pressure against the locking bar 620, thereby insuring against any backward movement of the counter gage under pressure of the shoe.

When the shoe has been positioned in the machine, the operator depresses the treadle 118 (Fig. 7) causing the sectors 92 together with the carrier plates 522 upon which the heel trimming mechanism is mounted, to be moved equal distances toward each other, inward movement of these members being limited by the engagement of the screw 290 (Figs. 1, 4 and 16), which is carried by the bracket 138 secured to the right sector 92, with the stop 124 which, as above described, is initially positioned widthwise of the machine in accordance with the width of the measured heel 36 in the gage 88. The front and rear crease plates 42, 44 together with their associated clamp members 52, 54, 56 and presser members 58, 60, 62, 64, 66 are thus moved to their widthwise operative positions in accordance with the width of the heel.

After the sectors 92 have reached the inward limits of their travel, further depression of the treadle 118 (Fig. 7) causes the link 296 to be raised against the action of the spring 114, thereby causing, through mechanism above described, the clamp members 52, 54 yieldingly to force the margin of the heel-seat portion of the sole against the crease plates 42, 44, and the presser members 60, 62, 64, 66 to brought down into engagement with the sole. Continued downward pressure of the treadle 118 causes the stop 124 to be cramped with additional pressure against the locking bar 507.

Having thus clamped the positioned heel-seat portion 30 of the sole 32 of the shoe in the machine, the operator, while keeping the treadle 118 depressed, depresses the forward end of the hand lever 228 to trip the one-revolution clutch (not shown). During the first part of the power cycle, the knives 72 are moved inwardly alternately to form the heel breast receiving shoulders 74 (Fig. 20) or 76 (Fig. 22) on the sole.

As above stated, in operating upon Louis work it is sometimes the practice to form undercut heel breast receiving shoulders 76 (Fig. 22) on the sole and to trim the upper lateral margins of the lip of the Louis heel to form the shoulders 35 (Fig. 23) which are approximately complemental to and in the finished shoe snugly engage said heel breast receiving shoulders. Accordingly, the machine equipped for this type of work is provided with the heel trimming knives 518 (Figs. 4 and 17) which are moved inwardly simultaneously during the cutting stroke of the right shoulder forming knife 72.

It will be appreciated that when the machine is operating upon shoes which are to receive regular Louis heels, the heel trimming knives 518 are removed from the machine and the dovetail guides 340 for the shoulder forming knives 72 are arranged approximately at right angles to the central heightwise plane 86. Moreover, it will be understood that when the machine is operating upon a shoe which is to receive a Cuban heel, the heel trimming knives 518 are removed from the machine, the dovetail guides 340 being set at a desired angle to said central heightwise plane 86 in accordance with the transverse curvature of the breast of the heel.

After the shoulder forming knives 72 and the heel trimming knives 518 have been withdrawn, the forward end of the power operated lever 212 is depressed thereby lowering the vertical slides 160 which carry the front clamp members 52 and the front presser members 58 and which, until now, have been held in their raised positions so as not to interfere with the movement of the knives 72. As the vertical slides 160 are depressed, their abutment faces 309 engage the abutment faces 311 of the carrier slides 178 with the result that during further downward movement of the slides 160 the right and left clamp members 52, 54, 56 force the margin of the heel-seat portion 30 of the sole 32 with additional pressure against the crease plates 42, 44 and the right and left presser members 58, 60, 62, 64, 66 move downwardly as a unit until the central part of said heel-seat portion is forced through the U-shaped opening 50 and below the approximately flat lower faces of the crease plates.

The back knife 78 is then moved forwardly with its cutting edge 80 in contact with the lower faces of the crease plates to trim the horseshoe-shaped piece of leather lying above said plates from the heel-seat portion of the sole. The back knife 78 continues to move forwardly until its cutting edge 80 intersects the cuts made by the shoulder forming knives 72, thereby forming the heel-seat tab 82 (Fig. 20) or 84 (Fig. 22) which corresponds in length and width to the length and width respectively, of the U-shaped opening 50. The back knife 78 is then retracted to its starting position and the vertical slides 160 are raised to their starting positions, shown in Figs. 1, 2 and 6, the machine then coming to rest.

The operator next removes his foot from the treadle 118 causing the lever 225 to be swung upwardly, thereby enabling the carrier slides 178 to be raised to their starting positions by the springs 200, the sectors 92 in the meanwhile being moved away from each other to their outward starting positions. The treadle 498 is then depressed and the heel 36 is removed from the heel gage 88 preparatory to placing another heel therein.

Having described my invention, what I claim is new and desire to secure by Letters Patent of the United States is:

1. A heel-seat fitting machine having, in combination, a platen comprising a plurality of crease plates which are shaped and arranged to form an opening and to support the heel-seat portion of a sole of a shoe, a bulger for forcing the central part of the heel-seat portion of the sole through said opening, means for relatively adjusting the crease plates to vary the shape of the opening, and means for varying the shape of the bulger in accordance with variations in the shape of the opening.

2. A heel-seat fitting machine having, in combination, a platen comprising a plurality of crease plates which are shaped and arranged to form an opening and to support the heel-seat portion of a sole of a shoe, a bulger comprising a plurality of presser members for forcing the central part of the heel-seat portion of the sole through said opening, means for effecting relative adjustment of the crease plates to vary the shape of said opening, and means for effecting relative adjustment of two or more of said presser members in accordance with the variations in the shape of said opening.

3. A heel-seat fitting machine having, in combination, a platen comprising a plurality of crease plates constructed and arranged to form an opening, means for effecting relative adjustment of the crease plates widthwise and lengthwise of the opening to vary the shape of said opening, a bulger comprising a plurality of presser members for forcing the central part of the heel-seat portion of the sole of a shoe supported by the crease plates through said opening, and means for effecting relative adjustment of the presser members to vary the effective length and width of the bulger in accordance with variations in the length and width respectively of said opening.

4. A heel-seat fitting machine having, in combination, a platen having a U-shaped opening, and a bulger for forcing the central part of the heel-seat portion of a sole supported by the platen through said opening, said bulger comprising a plurality of presser members, and means for relatively moving said presser members into different operative positions in accordance with the shape of the said opening of the platen.

5. A heel-seat fitting machine having, in combination, a platen having a U-shaped opening, and a bulger for forcing the central part of the heel-seat portion of a sole supported by the platen through said opening, said bulger comprising a plurality of presser members which extend along and are offset inwardly from the side margins of the U-shaped opening, one or more of said presser members being adjustable lengthwise of the U-shaped opening with relation to other presser members to vary the effective length of the bulger in accordance with the length of the U-shaped opening of the platen.

6. A heel-seat fitting machine having, in combination, a platen having an edge defining a U-shaped opening, a bulger for forcing the central part of the heel-seat portion of an attached sole of a shoe supported by the platen through said opening, said bulger comprising a plurality of presser members which extend along and are offset inwardly from the side margins of the U-shaped opening, and means for moving the presser members into different adjusted positions lengthwise and widthwise of the U-shaped opening to vary the shape of the bulger in accordance with the shape of said opening of the platen.

7. A heel-seat fitting machine having, in combination, a platen comprising a plurality of crease plates shaped and arranged to form a U-shaped opening and to support the heel-seat portion of an attached sole of a shoe, a bulger comprising a plurality of presser members having sole-engaging surfaces the outer peripheries of which have the general shape of a letter U, said bulger being constructed and arranged to force the central part of the heel-seat portion of the sole supported by the platen through said opening, means for effecting relative adjustment of the crease plates lengthwise and widthwise of the U-shaped opening to vary the shape of said opening, and means for effecting relative adjustment of the presser members lengthwise and widthwise of said opening to vary the shape of said U formed by the presser members in accordance with the shape of the U-shaped opening.

8. A heel-seat fitting machine having, in combination, a platen comprising a plurality of crease plates constructed and arranged to form a U-shaped opening, means for effecting relative adjustment of said plates lengthwise and widthwise of said opening to vary the shape of the opening, a bulger comprising two rows of presser members normally arranged adjacent to the opening and offset inwardly from the lateral margins respectively of said opening, means for effecting relative adjustment of the presser members of each row lengthwise of the opening in accordance with variations in the length of the U-shaped opening, and means for effecting relative adjustment of the rows of presser members in accordance with variations in the width of the U-shaped opening.

9. A heel-seat fitting machine having, in combination, a platen comprising crease plates which are constructed and arranged to form a U-shaped opening and are relatively adjustable to vary the shape of said opening, a bulger comprising two rows of presser members which extend along the lateral margins respectively of the U-shaped opening and which are normally arranged above the opening and are offset inwardly from the lateral margins of said opening, means for relatively adjusting one or more of the presser members of each row lengthwise of the opening to vary the lengths of the rows of presser members in accordance with variations in the length of the U-shaped opening, and means for moving the bulger to force the central part of the heel-seat portion of the sole of a shoe positioned upon the platen through the U-shaped opening.

10. A heel-seat fitting machine having, in combination, a platen comprising a plurality of crease plates having edges which lie approximately in a plane and are shaped and arranged to form a U-shaped opening, said crease plates being relatively adjustable lengthwise of the U-shaped opening to vary the length of said opening, bulger members having work-engaging faces arranged in rows which extend lengthwise of the U-shaped opening and are offset inwardly from the adjacent lateral margins of the opening, means for effecting relative adjustment of the bulger members lengthwise of the U-shaped opening to vary the lengths of the rows of bulger members in accordance with variations in the length of the U-shaped opening, means for moving the bulger members into the U-shaped opening of the platen to force the central part of the heel-seat portion of an attached sole of a shoe supported by the platen through said opening and beyond faces of the respective crease plates, a knife having a cutting edge, and means for moving the knife in a predetermined path with its cutting edge in engagement with said faces of the crease plates to reduce the heel-seat portion of the sole.

11. A heel-seat fitting machine having, in combination, a platen comprising a plurality of crease plates constructed and arranged to form a U-shaped opening, said crease plates being relatively adjustable lengthwise of the U-shaped opening to vary the length of said opening, a gage for measuring a heel lengthwise, a bulger comprising a plurality of presser members for forcing the central part of the heel-seat portion of an attached sole of a shoe supported by the crease plates through said opening, said presser members being relatively adjustable lengthwise of the U-shaped opening to vary the effective length of the bulger, and means for effecting relative adjustment of the crease plates and relative adjustment of the presser members lengthwise of the opening to vary the length of the U-shaped opening and the effective length of the bulger in accordance with the length of the heel in said gage.

12. A heel-seat fitting machine having, in combination, a platen comprising a plurality of crease plates constructed and arranged to form a U-shaped opening, said crease plates being relatively adjustable lengthwise and widthwise of the U-shaped opening to vary the length and the width of said opening, a bulger comprising a plurality of presser members for forcing the central part of the heel-seat portion of the sole of a shoe supported by the crease plates through said opening, said presser members being relatively adjustable lengthwise and widthwise of the U-shaped opening to vary the effective length and width of the bulger, a gage for measuring a heel lengthwise and widthwise, and means for effecting relative adjustment of the crease plates and relative adjustment of the presser members lengthwise and widthwise of the U-shaped opening to vary the length and the width of the opening and the effective length and width of the bulger in accordance with the length and width of the heel in said gage.

13. A heel-seat fitting machine having, in combination, crease plates for supporting the heel-seat portion of an attached sole of a shoe, said plates having edges shaped and arranged to form a U-shaped opening, means for relatively adjusting the plates widthwise and lengthwise of the U-shaped opening to vary the width and length of said opening, a clamp comprising a plurality of members constructed and arranged to force the margin of the heel-seat portion of the sole against portions of the plates bordering the U-shaped opening, a bulger comprising a plurality of presser members constructed and arranged to force the central part of the heel-seat portion of the sole through the U-shaped opening, means for relatively adjusting the clamp members and the presser members lengthwise and widthwise of the U-shaped opening in accordance with the adjustment of the crease plates, and means for reducing the heel-seat portion of the sole.

14. A heel-seat fitting machine having, in combination, a platen comprising overlapping front and rear pairs of crease plates shaped and arranged to form a U-shaped opening, means for moving the rear plates lengthwise of the U-shaped opening with relation to the front pair of crease plates in rectilinear paths to vary the length of said opening, and means for moving associated pairs of front and rear crease plates toward and away from each other in paths disposed at right angles to said first-named paths to vary the width of said opening.

15. A heel-seat fitting machine having, in combination, front and rear crease plates shaped and arranged to support the heel-seat portion of an attached sole of a shoe and having edges forming a U-shaped opening, a heel gage comprising an abutment for measuring a heel lengthwise, a stop which is operatively connected to and is positioned by said abutment, means for moving the rear crease plates with relation to the front crease plates to predetermined positions in accordance with the position of the stop, means comprising bulger members for forcing the central part of the heel-seat portion of the sole through the U-shaped opening, and a knife movable along the crease plates for reducing the heel-seat portion of the sole.

16. A heel-seat fitting machine having, in combination, a platen comprising right and left sets of crease plates having edges forming a U-shaped opening, said platen being constructed and arranged to engage within the rand crease of a shoe, right and left clamp members constructed and arranged to force the margin of the heel-seat portion of an attached sole of the shoe against portions of the plates bordering said opening, right and left bulger members constructed and arranged to force the central part of said heel-seat portion of the sole through the U-shaped opening, the right and left sets of crease plates together with their associated right and left clamp members and bulger members being mounted for adjustment toward and away from the other set of crease plates, clamp members and bulger members respectively widthwise of the U-shaped opening, a gage for measuring a heel widthwise, and mechanism for varying the adjusted positions of the associated right and left sets of crease plates, clamp members and bulger members toward and away from each other in accordance with the measured width of the heel in said gage.

17. A heel-seat fitting machine having, in combination, a gage for measuring a heel lengthwise and widthwise, a platen comprising pairs of front and rear crease plates for supporting the heel-seat portion of an attached sole of a shoe and having edges respectively shaped and arranged to form a U-shaped opening, means for moving the rear crease plates into different operative positions with relation to the front crease plates to vary the length of the U-shaped opening in accordance with the measured length of the heel in said gage, means for adjusting associated front and rear crease plates toward and away from the other associated front and rear crease plates to vary the width of the U-shaped opening in accordance with the width of the heel, a bulger comprising two rows of three or more presser members, means for adjusting at least two of the presser members of each row lengthwise of the U-shaped opening in response to movement of the rear crease plates, and means for adjusting the two rows of presser members toward and away from each other as units in accordance with changes in the width of the U-shaped opening.

18. In a heel-seat fitting machine, a platen having a U-shaped opening defined by an edge lying approximately in a plane, said platen having at its forward lateral portions thin ledges respectively the upper surfaces of which are arranged approximately in said plane, the forward edge of each of said upper surfaces extending outwardly and forwardly from an adjacent forward lateral end of the U-shaped opening.

19. In a heel-seat fitting machine, a platen having a U-shaped opening defined by an edge lying approximately in a plane, said platen having at its forward lateral portions thin ledges respectively the upper surfaces of which are arranged approximately in said plane, the forward edge of each of said upper surfaces extending outwardly and forwardly from an adjacent forward lateral end of the U-shaped opening and the rear edge of each of said upper surfaces extending outwardly and rearwardly from said adjacent forward lateral end of the U-shaped opening.

20. A trimming machine having, in combination, means for positioning a Louis heel, mechanism for measuring the heel widthwise, knives for forming at the upper breast margins of the heel a pair of shoulders which extend forwardly and inwardly from the sides of the heel and terminate at the forward edge of the forwardly projecting lip of the heel, and mechanism for initially moving the knives into different starting positions in accordance with the width of the heel in order to insure that the inner ends of the shoulders formed on heels of different widths shall be equidistant from the adjacent sides of the heels.

21. A trimming machine having, in combination, means for positioning a Louis heel, mechanism for measuring the heel widthwise, knives movable in predetermined paths toward a central heightwise plane of the heel to form at the upper breast margins of the heel a pair of shoulders which extend forwardly and inwardly from the sides of the heel and terminate at the forward edge of the forwardly projecting lip of the heel, mechanism for varying the angles at which the knives are moved toward said plane, and mechanism for moving the knives into different starting positions in accordance with the width of the heel.

22. A trimming machine having, in combination, means for positioning a heel, a pair of knives, means comprising guides for moving said knives in predetermined paths toward a central heightwise plane of the heel to form shoulders at the upper breast margins of said heel, mechanism for measuring the heel widthwise, and means for initially moving said guides into different adjusted positions widthwise of the heel in accordance with the setting of said heel-measuring mechanism.

23. A trimming machine having, in combination, means for positioning a Louis heel, mechanism for measuring the heel widthwise, knives movable in rectilinear paths toward a central heightwise plane of the heel to form shoulders at the upper breast margins of the heel, and means for moving the knives into different starting positions widthwise of the heel in accordance with the width of said heel in order to insure that for a given angle of cut the shoulders formed by said knives shall be of approximately uniform width irrespective of the width of the heel.

24. A trimming machine having, in combination, means for positioning a heel, a pair of knives movable in predetermined paths extending forwardly and inwardly from the opposite sides of the heel to form shoulders at the upper breast margins of the heel, and means for varying the paths of movement of the knives.

25. A trimming machine having, in combination, means for positioning a heel, means for measuring the heel widthwise, a pair of knives mounted for rectilinear movement toward a central heightwise plane of the heel to form shoulders at the upper breast margins of the heel, means for varying the angles at which the knives approach said plane, and means for varying the starting positions of the knives in accordance with the width of the heel.

26. A trimming machine having, in combination, means for positioning a heel, an abutment for measuring the heel widthwise, a pair of knives, and mechanism for operating and guiding said knives in rectilinear paths towards a central heightwise plane of the heel to form shoulders at the upper breast margins of the heel, said mechanism being movable into different adjusted positions widthwise of the heel in accordance with the position of said abutment.

27. A trimming machine having, in combination, means for positioning a heel, means for measuring the heel widthwise, a pair of knives, guides for controlling movement of said knives in predetermined paths toward a central heightwise plane of the heel to form shoulders at the upper breast margins of the heel, means for angularly adjusting said guides to vary the angles at which said knives approach said plane, and means for moving the guides as units into different adjusted positions at approximately right angles to said plane to vary the starting positions of the knives in accordance with the width of the heel.

28. A trimming machine having, in combination, means for positioning a Louis heel having an attaching face the rim of which lies in a plane, a pair of knives, guides for controlling the movement of said knives in predetermined paths, means for moving the knives along said paths to form at the upper breast margins of the forwardly projecting lip of the heel shoulders extending forwardly and inwardly from the sides of the heel and terminating at the forward edge of said lip, and means for angularly adjusting said guides about axes respectively which are disposed at right angles to said plane of the rim and pass approximately through the inner ends of the shoulders.

29. A trimming machine having, in combination, means for positioning a Louis heel having an attaching face the rim of which lies in a plane, means for measuring the heel widthwise, a pair of knives movable in predetermined paths angularly disposed to a central heightwise plane of the heel to form at the upper breast margins of the heel shoulders which extend forwardly and inwardly from the sides respectively of the heel and terminate at the forward edge of the forwardly projecting lip of the heel, means for varying the paths of movement of the knives with relation to said central heightwise plane about axes which are disposed at right angles to said plane of the rim and extend approximately through the inner ends respectively of said shoulders, and mechanism for varying the starting positions of the knives in accordance with the positions of said heel-measuring means.

30. A trimming machine having, in combination, means for positioning a Louis heel, means comprising an abutment for measuring the heel widthwise, a pair of carrier plates movable at approximately right angles to a central heightwise plane of the heel, a pair of guides angularly adjustable upon the respective carrier plates, a pair of slides to which the respective knives are secured constrained for movement in predetermined paths by said guides, means for operating the slides to form at the upper breast margins of the heel a pair of shoulders which extend from the sides respectively of the heel forwardly and inwardly to the forward edge of the forwardly projecting lip of the heel, and means for initially moving the carrier plates toward and away from the heel in accordance with the position of said abutment to insure that for a given angle of cut the relative starting positions of the knives and the upper breast portions of the heel shall remain constant irrespective of the width of the heel.

31. A heel-seat fitting and heel-trimming machine having, in combination, means for positioning a Louis heel, means for measuring the heel widthwise, knives movable inwardly from opposite sides of the heel to form shoulders at the upper breast margins of the heel, means for positioning the heel-seat portion of an attached sole of a shoe, knives movable inwardly from opposite sides of the shoe to form heel-breast receiving shoulders upon the sole, and means for varying the starting positions of the heel trimming and the shoulder-forming knives in accordance with the width of the heel.

32. A heel-seat fitting and heel-trimming machine having, in combination, means for measuring a Louis heel widthwise, a pair of knives, means for moving said knives in predetermined paths toward a central heightwise plane of the heel to form shoulders at the upper breast margins of the heel, means for positioning the heel-seat portion of an attached sole of a shoe, another pair of knives, means for moving said second pair of knives in predetermined paths to form heel-breast-receiving shoulders upon said sole, and mechanism for varying the locations of the paths of movement of said first- and second-named knives widthwise of the heel and the sole respectively in accordance with the width of the measured heel.

33. A heel-seat fitting and heel-trimming machine having, in combination, means for measuring a Louis heel widthwise, a pair of carrier slides, a pair of knives and guides therefor mounted upon the slides, means for operating the knives to form shoulders at the upper breast margins of the heel, means for positioning the heel-seat portion of an attached sole of a shoe and securing the same against movement, a pair of carrier beds, a pair of knives and guides therefor mounted upon the beds respectively, means for operating the second-named knives to form heel-breast-receiving shoulders upon the sole of the shoe, and mechanism for moving the carrier slides and the carrier beds into different operative positions widthwise of the heel and the shoe respectively in accordance with the width of the measured heel.

34. A heel-seat fitting machine having, in combination, means for positioning the heel-seat portion of an attached sole of a shoe, a pair of knives, a pair of carrier beds for the knives respectively, said beds being movable equal distances in opposite directions toward and away from the sides respectively of the shoe, means for moving the knives toward the shoe with relation to the carrier beds to form heel-breast receiving shoulders upon the sole of the shoe, means for positioning a heel, a gage comprising an abutment for measuring the heel widthwise, a second pair of knives, a pair of carrier plates for the second-named knives, means for moving the second-named knives forwardly and inwardly from opposite sides of the heel to form shoulders at the upper breast margins of the heel, and means for moving the carrier beds and the carrier plates into different operative positions widthwise of the shoe and the heel respectively in accordance with the position of the abutment of the heel gage.

35. A heel-seat fitting and heel-trimming machine having, in combination, means for measuring a heel lengthwise and widthwise, a platen comprising a plurality of crease plates constructed and arranged to form a U-shaped opening, mechanism for varying the length and width of the U-shaped opening in accordance with the length and width respectively of the heel, knives for forming heel-breast receiving shoulders on a sole supported by the platen, knives for forming shoulders at the upper breast margins of the heel, and mechanism for varying the starting positions of the heel and sole-trimming knives respectively in accordance with the width of the heel.

36. A heel-seat fitting and heel-trimming machine having, in combination, a gage constructed and arranged to secure a Louis heel in a predetermined position and to measure the same lengthwise and widthwise, knives movable inwardly and forwardly from opposite sides of the heel to form shoulders at the forward lateral margins of the forwardly projecting lip of the heel, means for supporting the heel-seat portion of an attached sole of a shoe, means for positioning the shoe lengthwise in accordance with the length of the heel in the heel gage, knives movable inwardly and forwardly from opposite sides of the shoe to form upon the sole of the shoe heel-breast receiving shoulders which are constructed and arranged to be engaged by said shoulders of the heel after said heel has been positioned upon the shoe, and means for varying the starting positions of said first- and second-named knives in accordance with the width of the heel.

37. A heel-seat fitting and heel-trimming machine having, in combination, a gage for measuring a heel widthwise, carrier slides arranged at opposite sides of the heel and mounted for equal and opposite movement toward and away from the sides respectively of the heel, a pair of knives, a pair of guides angularly adjustable upon the carrier slides respectively and constructed and arranged to control the knives in predetermined paths, means for operating the knives along said guides to form shoulders at the upper breast margins of the heel, means for positioning the heel-seat portion of an attached sole of a shoe, carrier beds arranged at opposite sides of the shoe and connected to the respective carrier slides, a second pair of knives, guides secured to and angularly adjustable with relation to the carrier beds respectively and constructed and arranged to control the second-named knives in predetermined paths, means for moving said second-named knives along said second-named guides to form upon the sole heel breast receiving shoulders which are approximately complemental to the shoulders formed upon the heel, and means for initially moving associated carrier slides and carrier beds together into predetermined positions determined by the heel in said gage toward and away from the heel and the shoe preparatory to operating said knives.

38. A heel-seat fitting and heel-trimming machine having, in combination, a gage comprising an abutment for measuring a Louis heel widthwise, carrier slides arranged at opposite sides respectively of the heel and movable toward and away from said heel, a pair of knives for forming shoulders at the upper breast margins of the heel, guides and operating mechanism for the knives mounted upon the carrier slides, respectively, means for positioning the heel-seat portion of an attached sole of a shoe, carrier beds which are connected to the carrier slides respectively and which are arranged at opposite sides of the shoe and are movable equal distances in opposite directions toward and away from the shoe, a pair of knives for forming upon the sole of the shoe heel-breast receiving shoulders which are complemental to the shoulders formed upon the heel, guiding and operating means for said second-named knives mounted upon the carrier beds respectively, a stop operatively connected to said abutment, and means for moving associated carrier slides and carrier beds equal distances toward the sides of the heel and the shoe respectively as units until said movement is limited by said stop thereby moving the knives into different starting positions which are determined by the width of the heel in the gage.

39. A heel-seat fitting and heel-trimming machine having, in combination, a gage for measuring a Louis heel widthwise, a pair of knives, guides for the knives, means for causing the knives to be moved in paths determined by the guides forwardly and inwardly from opposite sides of the heel to form shoulders at the upper breast margins of the heel, means for positioning the heel-seat portion of an attached sole of a shoe to which the heel is to be attached, a second pair of knives, guides for the said second-named knives, means for causing the second-named knives to move in paths determined by the second-named guides inwardly and forwardly of the sole to form thereon heel-breast-receiving shoulders which are complemental to the shoulders formed upon the heel, and means for moving said first- and second-named guides widthwise of the heel and shoe respectively into predetermined starting positions in accordance with the width of the heel in said gage preparatory to operating the knives in said paths.

40. A heel-seat fitting machine having, in combination, front and rear crease plates constructed and arranged to support the heel-seat portion of an attached sole of a shoe and having edges forming a U-shaped opening, means for moving the rear crease plates into different adjusted positions lengthwise of the U-shaped opening with relation to the front crease plates to vary the length of said opening, a bulger comprising rows of presser members for forcing the central part of the heel-seat portion of the sole through the U-shaped opening, and mechanism movable in response to movement of the rear crease plates, said mechanism being constructed and arranged to cause the rear presser members of each row to move with and to the same extent as the rear crease plates lengthwise of the U-shaped opening.

41. A heel-seat fitting machine having, in combination, front and rear crease plates constructed and arranged to support the heel-seat portion of an attached sole of a shoe and having edges forming a U-shaped opening, means for moving the rear crease plates into different adjusted positions lengthwise of the U-shaped opening with relation to the front crease plates to vary the length of said opening, a bulger comprising rows of presser members for forcing the central part of the heel-seat portion of the sole through the U-shaped opening, and mechanism movable in response to movement of the rear crease plates, said mechanism being constructed and arranged to cause the rear presser members of each row to move with and to the same extent as the rear crease plates lengthwise of the U-shaped opening and to cause other presser members of each row to move to less extents lengthwise of said opening.

42. A trimming machine having, in combination, means for positioning a Louis heel having an attaching face the rim of which lies in a plane, a pair of knives having cutting edges, guides for the knives, and means for moving the knives predetermined distances inwardly and forwardly toward a central heightwise plane of the heel in paths determined by the guides to form a pair of shoulders at the upper breast margins of the heel, said guides being initially adjustable about axes respectively which are disposed at right angles to said plane of the rim and extend approximately along the cutting edges of the knives at the inner limits of their travel.

43. A trimming machine having, in combination, means for positioning a heel, a pair of knives, guides for the knives, and means for moving the knives in paths determined by the guides toward the central heightwise plane of the heel to form shoulders at the upper breast margins of said heel, said guides being movable into different adjusted positions to vary the angles at which the knives approach said plane during their cutting movement.

44. A trimming machine having, in combination, means for positioning a heel, a pair of knives movable in rectilinear paths extending forwardly and inwardly toward a central heightwise plane of the heel from the opposite sides of said heel to form shoulders at the upper breast margins of the heel, and means for varying the angles at which the knives approach said plane during their cutting stroke.

GEORGE HAZELTON.